US011440561B2

(12) United States Patent
Kanekawa et al.

(10) Patent No.: US 11,440,561 B2
(45) Date of Patent: Sep. 13, 2022

(54) CONTROL SYSTEM AND CONTROL METHOD

(71) Applicant: HITACHI, LTD., Tokyo (JP)

(72) Inventors: Nobuyasu Kanekawa, Tokyo (JP); Shinji Nakagawa, Tokyo (JP)

(73) Assignee: HITACHI, LTD., Tokyo (JP)

(*) Notice: Subject to any disclaimer, the term of this patent is extended or adjusted under 35 U.S.C. 154(b) by 98 days.

(21) Appl. No.: 16/608,646

(22) PCT Filed: Apr. 9, 2018

(86) PCT No.: PCT/JP2018/014914
§ 371 (c)(1),
(2) Date: Oct. 25, 2019

(87) PCT Pub. No.: WO2018/198743
PCT Pub. Date: Nov. 1, 2018

(65) Prior Publication Data
US 2020/0139988 A1 May 7, 2020

(30) Foreign Application Priority Data
Apr. 27, 2017 (JP) .............................. JP2017-088602

(51) Int. Cl.
*B60W 50/10* (2012.01)
*B60W 50/00* (2006.01)
*G05D 1/00* (2006.01)

(52) U.S. Cl.
CPC ........ *B60W 50/10* (2013.01); *B60W 50/0098* (2013.01); *G05D 1/0055* (2013.01)

(58) Field of Classification Search
CPC ............. G05D 2201/0213; G05D 1/00; G05D 1/0061; G05D 1/02; G05D 1/0268;
(Continued)

(56) References Cited

U.S. PATENT DOCUMENTS

| 2010/0010699 A1 | 1/2010 | Taguchi et al. |
| 2016/0207538 A1 | 7/2016 | Urano et al. |
| 2018/0157256 A1* | 6/2018 | Oniwa ................. G05D 1/0061 |

FOREIGN PATENT DOCUMENTS

| JP | 2008-117082 A | 5/2008 |
| JP | 2012-121534 A | 6/2012 |

(Continued)

OTHER PUBLICATIONS

International Search Report dated Jul. 3, 2018 for the PCT International Application No. PCT/JP2018/014914.

*Primary Examiner* — Anthony R Jimenez
(74) *Attorney, Agent, or Firm* — Volpe Koenig

(57) ABSTRACT

A control system includes a manipulation interface unit that generates manipulation quantity information and priority information, a plurality of automatic control units that generates automatic control outputs based on predetermined inputs, safety verification units that confirm safety of the automatic control outputs, and an output control unit that outputs a control output according to any one of a predetermined automatic control output and the manipulation quantity information. Based on the priority information, the output control unit selects an automatic control output having the highest selection priority from the automatic control outputs of which the safety is confirmed to generate the control output, generates the control output according to the manipulation quantity information when the safety verification units confirm the safety, or generates the control output according to the manipulation quantity information regardless of the safety confirmation results.

10 Claims, 42 Drawing Sheets

(58) Field of Classification Search
CPC .. G05D 1/0223; G05D 1/0278; G05D 1/0088; B60W 2550/00; B60W 2550/10; B60W 2550/30; B60W 2550/40; B60W 2710/00; B60W 2710/18; B60W 2710/20; B60W 30/00; B60W 30/08; B60W 30/18; B60W 30/181; B60W 30/18109; B60W 30/182; B60W 30/188; B60W 2900/00; B60W 20/00; B60W 20/10; B60W 20/14; B60W 20/15; B60W 20/40; B60W 20/50; B60W 2201/00; B60W 2201/02; B60W 40/09; B60W 50/14; B60W 50/10; B60W 50/082; B60W 2050/0073; B60W 2050/0096; B60W 2540/18; B60W 2540/10; B60W 2540/12; B60W 2540/215; B60W 10/08; B60W 10/18; B60W 10/06; B60W 50/00; B62D 6/00
See application file for complete search history.

(56) References Cited

FOREIGN PATENT DOCUMENTS

| | | |
|---|---|---|
| JP | 2013-129328 A | 7/2013 |
| JP | 2016-132352 A | 7/2016 |
| JP | 2016-159781 A | 9/2016 |
| WO | 2016/181725 A1 | 11/2016 |

\* cited by examiner

FIG. 31

| CASE | OVERRIDE 12 PRIORITY 13 | OVERRIDE 12 VERIFICATION RESULT | CONTROL 21-1 VERIFICATION RESULT | CONTROL 21-2 VERIFICATION RESULT | ... | CONTROL 21-n VERIFICATION RESULT | CONTROL OUTPUT 60 |
|---|---|---|---|---|---|---|---|
| 1 | 0 | * | OK | * | ... | * | CONTROL 21-1 |
| 2 | 0 | * | NG | OK | ... | * | CONTROL 21-2 |
| ... | ... | ... | ... | ... | ... | ... | ... |
| 3 | 0 | * | NG | NG | ... | OK | CONTROL 21-n |
| 4 | 0 | * | OK w/limit | OK w/limit | ... | OK w/limit | CONTROL 21-1 limit |
| 5 | 0 | * | OK w/limit | NG | ... | NG | CONTROL 21-1 limit |
| 6 | 0 | * | NG | OK w/limit | ... | OK w/limit | CONTROL 21-2 limit |
| 7 | 0 | * | NG | OK w/limit | ... | NG | CONTROL 21-2 limit |
| ... | ... | ... | ... | ... | ... | ... | ... |
| 8 | 0 | * | NG | NG | ... | OK w/limit | CONTROL 21-n limit |
| 9 | 0 | * | NG | NG | ... | NG | OUTPUT STOP |
| 10 | 1 | OK | * | * | ... | * | MANIPULATION 12 |
| 11 | 1 | OK w/limit | * | * | ... | * | MANIPULATION 12 limit |
| 12 | 2 | * | * | * | ... | * | MANIPULATION 12 |

FIG. 32

| CASE | OVERRIDE 12 | | CONTROL 21-1 VERIFICATION RESULT | CONTROL 21-2 VERIFICATION RESULT | ... | CONTROL 21-n VERIFICATION RESULT | CONTROL OUTPUT 60 |
|---|---|---|---|---|---|---|---|
| | PRIORITY 13 | VERIFICATION RESULT | | | | | |
| 1 | 0 | * | OK | * | ... | * | CONTROL 21-1 |
| 2 | 0 | * | NG | OK | ... | * | CONTROL 21-2 |
| ... | ... | ... | ... | ... | ... | ... | ... |
| 3 | 0 | * | NG | NG | ... | OK | CONTROL 21-n |
| 4 | 0 | * | OK w/limit | OK w/limit | ... | OK w/limit | OUTPUT STOP |
| 5 | 0 | * | OK w/limit | NG | ... | NG | OUTPUT STOP |
| 6 | 0 | * | NG | OK w/limit | ... | OK w/limit | OUTPUT STOP |
| 7 | 0 | * | NG | OK w/limit | ... | NG | OUTPUT STOP |
| ... | ... | ... | ... | ... | ... | ... | ... |
| 8 | 0 | * | NG | NG | ... | OK w/limit | OUTPUT STOP |
| 9 | 0 | * | NG | NG | ... | NG | OUTPUT STOP |
| 10 | 1 | OK | * | * | ... | * | MANIPULATION 12 |
| 11 | 1 | OK w/limit | * | * | ... | * | MANIPULATION 12 limit |
| 12 | 2 | * | * | * | ... | * | MANIPULATION 12 |

FIG. 37

| Case | AUTOMATIC CONTROL OUTPUT 21 | | SAFETY CONTROL OUTPUT 60 | | |
|---|---|---|---|---|---|
| | $\alpha i$ | $\beta i$ | $\alpha$ | $\beta$ | |
| P1 | OK | OK | $\alpha i$ | $\beta i$ | AUTOMATIC CONTROL OUTPUT 21 |
| P2 | OK | OK w/limit | $\alpha i$ | ;limited $\beta i$ | |
| P3 | OK w/limit | OK | limited $\alpha i$ | $\beta i$ | |
| P4a | OK w/limit | OK w/limit | $\alpha i$ | ;limited $\beta i$ | AUTOMATIC CONTROL OUTPUT 21 OUTPUT RESTRICTION |
| P4b | | | limited $\alpha i$ | $\beta i$ | |
| P4c | | | limited $\alpha i$ | ;limited $\beta i$ | |
| P5 | NG | NG | NG | | OUTPUT STOP |
| P5a | | | POINT CORRECTED IN DIRECTION OF CENTER OF GRAVITY OF NORMAL REGION | | |
| P5b | | | POINT CORRECTED TO SHORTEST DISTANCE OF NORMAL REGION | | |

CONTROL SYSTEM AND CONTROL METHOD

TECHNICAL FIELD

The present invention relates to a control system and a control method.

BACKGROUND ART

In fully automated control including automatic driving, since an artificial manipulation is not permitted, it is possible to reduce a probability of an accident caused by an artificial error, and thus, it is possible to improve safety. Meanwhile, it is possible to ensure safety when a failure of a control device failure or an unexpected situation occurs by enabling an artificial override (operation intervention) in an emergency. PTL 1 is known as a technology for enabling the artificial override in the emergency.

PTL 1 discloses that the "present invention detects an obstacle present around a vehicle, generates a plurality of target trajectories in order for the vehicle to avoid the detected obstacle, and detects, as an intention of a driver, an avoidance direction of the vehicle for the obstacle determined by a manipulation of the driver, selects a target trajectory in the avoidance direction in which the intention of the driver is reflected from the plurality of generated target trajectories, and performs trajectory control for avoiding the obstacle based on the selected target trajectory".

PTL 2 discloses that "there is provided a traveling control plan evaluation device capable of properly evaluating safety of a traveling control plan of an automatic driving vehicle. A traveling control plan evaluation device 10 that evaluates the safety of the traveling control plan of the automatic driving vehicle is provided. This device 10 includes behavior estimation means 16a for estimating a behavior that may be taken by a vehicle around the automatic driving vehicle at a certain time, presence position prediction means 16b that predicts a presence position of the vehicle around the automatic driving vehicle in the future later than the certain time based on the presence position of the vehicle around the automatic driving vehicle at the certain time and the behavior estimated by the behavior estimation means 16a, and evaluation means 20 that evaluates the safety of the traveling control plan based on the presence position of the vehicle around the automatic driving vehicle predicted by the presence position prediction means 16b and the presence position using the traveling control plan of the automatic driving vehicle".

PTL 3 discloses that "there is provided an automatic driving vehicle system that reduces a troublesome manipulation of a driver when the driver temporarily intervenes in a vehicle in an automatic driving state. The system includes an acquisition unit that acquires a manipulation quantity of a driving manipulation of the driver or a duration count corresponding to a duration of the driving manipulation, and a switching unit that switches between an automatic driving state, a cooperative driving state, and a manual driving state based on the manipulation quantity or the continuation count. The switching unit switches the automatic driving state to the cooperative driving state when the manipulation quantity is equal to or greater than an intervention threshold and is less than a start threshold or the duration count is equal to or greater than a first threshold and is less than a second threshold in the automatic driving state, and switches the cooperative driving state to the automatic driving state when the manipulation quantity is less than the intervention threshold or the duration count is less than the first threshold or switches the cooperative driving state to the manual driving state when the manipulation quantity is equal to greater than the start threshold or the duration count is equal to or greater than the second threshold in the cooperative driving state".

CITATION LIST

Patent Literature

PTL 1: JP 2013-129328 A
PTL 2: JP 2008-117082 A
PTL 3: JP 2016-132352 A

SUMMARY OF INVENTION

Technical Problem

In the related arts, only any one of the automatic driving state and the override state can be selected, and thus, usability is not favorable.

The present invention has been made in view of the aforementioned problems, and an object of the present invention is to provide a control system and a control method capable of generating a control output according to manipulation quantity information of a manipulation interface unit within a range in which safety is confirmed.

Solution to Problem

In order to solve the aforementioned problems, a control system according to one aspect of the present invention is a control system that generates a control output. The system includes a manipulation interface unit that generates manipulation quantity information and priority information based on a manipulation quantity which is a physical quantity, a plurality of automatic control units that generates automatic control outputs based on predetermined inputs, safety verification units that confirm safety for the automatic control outputs, respectively, and an output control unit that outputs a control output according to any one of a predetermined automatic control output selected from the automatic control outputs and the manipulation quantity information based on the automatic control outputs, the manipulation quantity information and the priority information, and the safety confirmation results of the safety verification units. Based on the priority information, the output control unit selects, as the predetermined automatic control output, an automatic control output having the highest selection priority from the automatic control outputs of which the safety is confirmed by the safety verification units among the automatic control outputs, and generates the control output according to the selected predetermined automatic control output, generates the control output according to the manipulation quantity information when a predetermined safety verification unit among the safety verification units that confirms the safety of the predetermined automatic control output confirms the safety, or generates the control output according to the manipulation quantity information regardless of the safety confirmation results of the safety verification units.

Advantageous Effects of Invention

According to the present invention, based on the priority information, the output control unit can perform any one of generating the control output according to the automatic control output having the highest selection priority from the automatic control outputs of which the safety is confirmed, generating the control output according to the manipulation quantity information when the safety verification units confirm the safety, and generating the control output according to the manipulation quantity information regardless of the safety confirmation results of the safety verification units.

Accordingly, usability is improved.

BRIEF DESCRIPTION OF DRAWINGS

FIG. 31 is an explanatory diagram illustrating an example of an output selection method.

FIG. 32 is an explanatory diagram illustrating another example of the output selection method.

FIG. 37 is an explanatory diagram illustrating a content example of a method of restricting the automatic control output.

DESCRIPTION OF EMBODIMENTS

Figure 1:
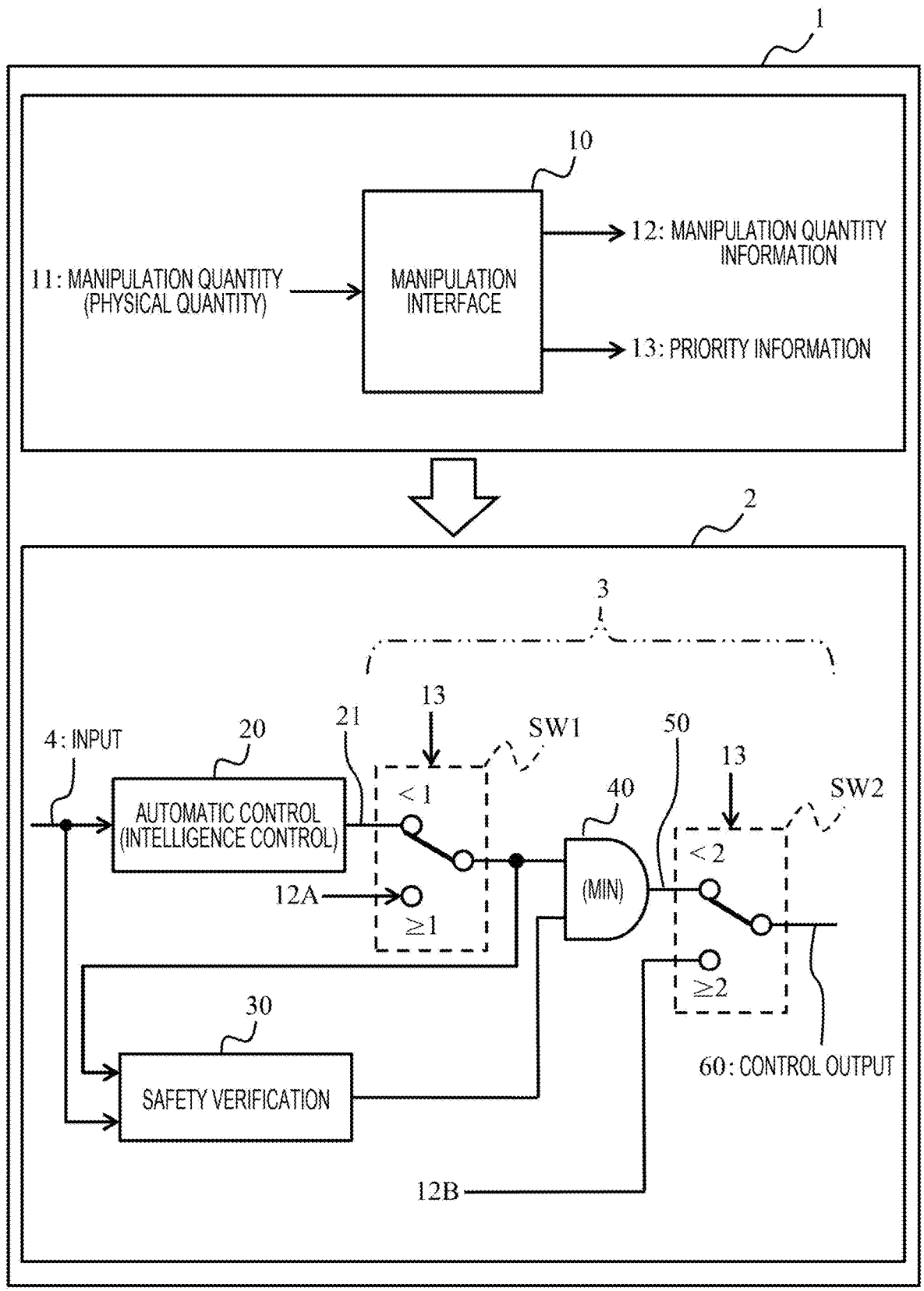
FIG. 1 is an overall configuration diagram of a control system.

Hereinafter, embodiments of the present invention will be described with reference to the drawings. In the present embodiment, as will be described below, an interface (hereinafter, referred to as a manipulation interface) 10 that receives an override related to a manipulation has a function of converting a physical quantity 11 of a manipulation quantity into manipulation quantity information 12, and a function of converting the physical quantity 11 of the manipulation quantity into priority information 13 as an attribute attached to the manipulation quantity information 12. Hereinafter, the physical quantity of the manipulation quantity may be referred to as the "manipulation quantity as the physical quantity", the "manipulation quantity (physical quantity)", or the "manipulation quantity".

In the present embodiment, an automatic control unit 20 that generates an automatic control output and a safety verification unit 30 that verifies the safety of the automatic control output are provided. In the present embodiment, when the priority information is less than a predetermined threshold, control is performed under the restriction of the safety verification unit 30, and when the priority information is greater than the predetermined threshold, control is performed without being restricted by the verification unit 30.

According to the present embodiment, three operation modes can be automatically switched by a user manipulation input depending on a situation. That is, according to the present embodiment, since three operation modes of an operation mode in which an operation is performed based on the automatic control output, an operation mode in which an override (artificial intervention manipulation) operation is permitted under the restriction of the safety verification unit, and an operation mode in which the override manipulation is permitted without being restricted by the safety verification unit can be switched, the usability of a user is improved. According to the present embodiment, it is possible to obtain an appropriate control output corresponding to the situation even when an override operation in an emergency is different from safety determination in the safety verification unit.

First Embodiment

A first embodiment will be described with reference to FIG. 1. FIG. 1 is a block diagram illustrating an overall configuration of a control system 1. The control system 1 includes the manipulation interface unit 10 illustrated on an upper side of FIG. 1 and a control device 2 illustrated on a lower side of FIG. 1.

The manipulation quantity (physical quantity) 11 is input to the manipulation interface 10 by a user (not illustrated). The manipulation interface unit 10 obtains the manipulation quantity information 12 and the priority information 13 as information from the input manipulation quantity (physical quantity) 11.

The control device 2 is connected to the manipulation interface unit 10 in a wired or wireless manner, and generates a control output 60 for controlling a control target (not illustrated) based on the manipulation quantity information 12 and the priority information 13 input from the manipulation interface unit 10. The manipulation interface unit 10 and the control device 2 may be separately provided, and may be connected through a cable or a communication network. Alternatively, the manipulation interface unit 10 and the control device 2 may be integrally provided.

The control device 2 includes, for example, the automatic control unit 20, the safety verification unit 30, an AND gate 40, and a plurality of switches SW1 and SW2. Here, the switches SW1 and SW2 and the AND gate 40 constitute an output control unit 3.

The automatic control unit 20 generates an automatic control output 21 for automatically controlling the control target based on a predetermined input 4, and outputs the automatic control output 21. The first switch SW1 which is an example of a "first selection unit" selects and outputs one of a plurality of inputs according to the priority information 13. The automatic control output 21 and manipulation quantity information 12A are input to the first switch SW1. The manipulation quantity information 12A is manipulation quantity information input from the manipulation interface unit 10 to the first switch SW1. Manipulation quantity information 12B is manipulation quantity information input from the manipulation interface unit 10 to the second switch SW2.

The first switch SW1 compares the priority information 13 input from the manipulation interface unit 10 with a predetermined first value "1". When the priority information 13 is less than "1", the first switch SW1 selects the automatic control output 21 and outputs the selected automatic control output to the AND gate 40. In contrast, when the priority information 13 is equal to or greater than "1", the first switch SW1 outputs the manipulation quantity information 12A from the manipulation interface unit 10 to the AND gate 40.

The safety verification unit 30 verifies the safety of an output of the first switch SW1 from the input 4 for the automatic control unit 20 and the output of the first switch SW1 (any one of the automatic control output 21 and the manipulation quantity information 12A). A case where the safety of the output is verified means that it is determined whether or not the control target is safely operated when the output of the first switch SW1 is input to the control target (not illustrated).

When it is confirmed that the output of the first switch SW1 is safe, the safety verification unit 30 can output a signal to the AND gate 40, and the AND gate 40 can output an input from the first switch SW1. By contrast, when the safety of the output of the first switch SW1 is not confirmed, the safety verification unit 30 causes the AND gate 40 to block or restrict the output of the first switch SW1.

As described above, the AND gate 40 which is an example of a "safety confirmation unit" is a circuit that outputs, blocks, or restricts the input from the first switch SW1 with no change according to a control signal input from the safety verification unit 30. Instead of the AND gate 40, a minimum value selection circuit that selects a minimum value may be used as the safety confirmation unit. The AND gate 40 outputs, as a safety restriction output 50, the input from the first switch SW1 within a range in which the safety is confirmed by the safety verification unit 30.

The safety restriction output 50 from the AND gate 40 and the manipulation quantity information 12B are input to the second switch SW2 which is an example of a "second selection unit". The second switch SW2 compares the priority information 13 from the manipulation interface unit 10 with a predetermined second value "2". When the priority information 13 is less than "2", the second switch SW2 selects the safety restriction output 50 from the AND gate 40, and outputs, as the control output 60, the safety restriction output 50 to the control target. In contrast, when the priority information 13 is equal to or greater than "2", the second switch SW2 selects the manipulation quantity information 12B, and outputs, as the control output 60, the manipulation quantity information 12B to the control target.

In the present embodiment having the aforementioned configuration, (1) when the priority information 13 is less than "1", the automatic control output 21 is selected by the first switch SW1, and is output as the control output 60 under the monitoring of the safety verification unit 30. (2) When the priority information 13 is equal to or greater than "1" and is less than "2", the first switch SW1 selects the manipulation quantity information 12A, and outputs, as the control output 60, the selected manipulation quantity information under the restriction of the safety verification unit 30. (3) When the priority information 13 is equal to or greater than "2", the second switch SW2 selects the manipulation quantity information 12B, and outputs, as the control output 60, the selected manipulation quantity information. The control output 60 is the manipulation quantity information 12B with no change, and is not restricted by the safety verification unit 30.

According to the present embodiment, since the safety of the automatic control output 21 from the automatic control unit 20 is monitored by the safety verification unit 30, a safe operation of the control target can be guaranteed. According to the present embodiment, since the strength of a request for override from the user is detected as the priority information 13, an appropriate override can be realized depending on an emergency situation. That is, in the present embodiment, since two overrides of the override ("1"<priority information 13 <"2") that is restricted by the safety verification unit 30 and the override ("2"<priority information 13) that is not restricted by the safety verification unit 30 can be automatically selected depending on the situation, the usability of the user is improved.

It is expected that the control performance exceeding human knowledge is realized by introducing, as the automatic control unit 20, artificial intelligence such as deep learning or machine learning. However, since the control performance exceeds human knowledge, it is desirable to improve accountability (answerability) related to the safety. Therefore, in the present embodiment, the safety can be ensured even in advanced control exceeding human knowledge due to artificial intelligence by adding the safety verification unit 30.

Second Embodiment

A second embodiment will be described with reference to FIG. 2. The following embodiments including the present embodiment correspond to modification examples of the first embodiment, and thus, differences from the first embodiment will be mainly described. In the present embodiment, a stepwise change is suppressed when the output is switched.

In the switches SW1 and SW2 described in FIG. 1, since there is a difference between the plurality of inputs, the stepwise change occurs in the output when the input is switched from one input to the other input. For example, when the first switch SW1 is switched from the automatic control output 21 to the manipulation quantity information 12A according to a change in the priority information 13, the stepwise change occurs in the output of the first switch SW1.

Therefore, as represented in Equation 1, the stepwise change can be suppressed in the output out by gradually switching from one input ina to the other input inb over a time between 0<t<T.

$$\text{out}=(ina(T-t)ina+t*inb)/T \quad \text{(Equation 1)}$$

Figure 2:
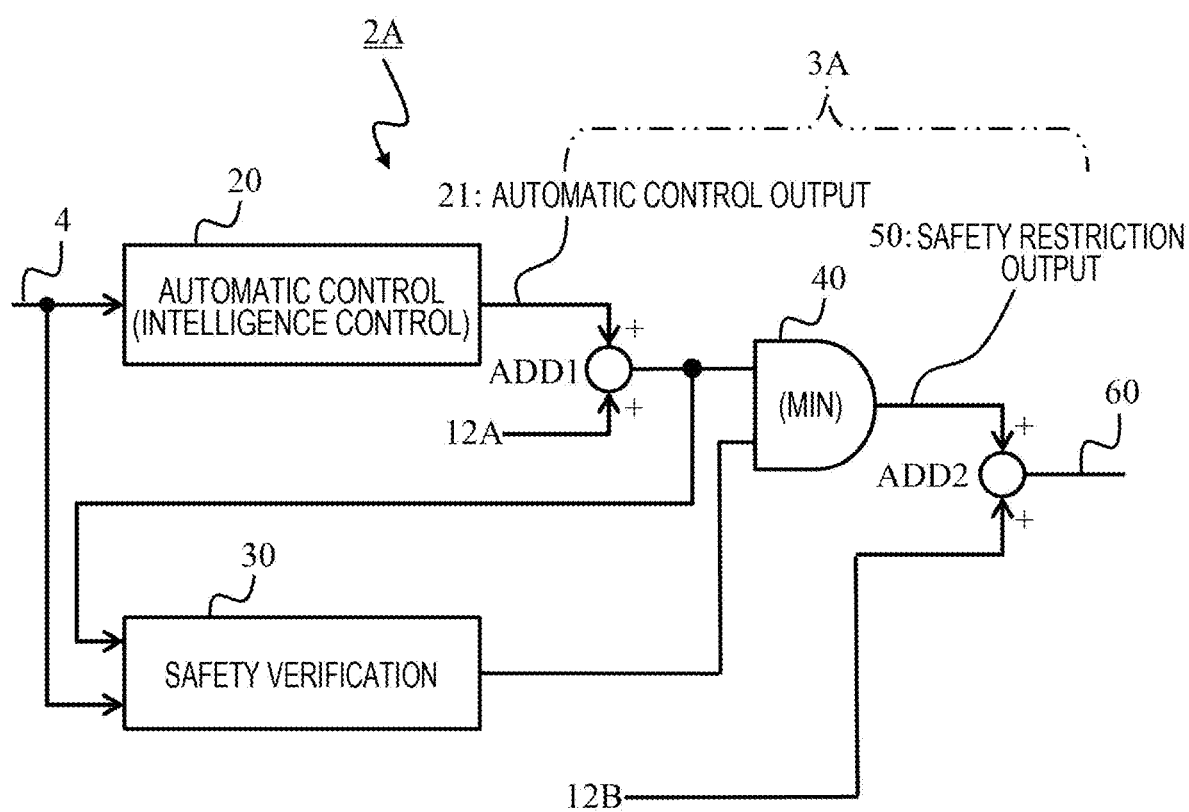
FIG. 2 is a block diagram illustrating a configuration of a control device according to a second embodiment.

FIG. 2 illustrates another example in which the stepwise change is suppressed. In a control device 2A illustrated in FIG. 2, addition units ADD1 and ADD2 are used in an output control unit 3A. That is, in FIG. 2, the addition units ADD1 and ADD2 are used instead of the switches SW1 and SW2.

The first addition unit ADD1 adds the automatic control output 21 and the manipulation quantity information 12A, and outputs the resultant value to the AND gate 40. The second addition unit ADD2 generates the control output 60 by adding the safety restriction output 50 from the AND gate 40 and the manipulation quantity information 12B.

The manipulation quantity information 12A is added to the automatic control output 21, and thus, an output change of the first addition unit ADD1 can be smoother than that in the case of the first switch SW1. Similarly, the manipulation quantity information 12B is added to the safety restriction output 50, and thus, an output change of the second addition unit ADD2 can be smoother than that in the case of the second switch SW2. As a result, in the present embodiment, it is possible to obtain the control output 60 with a less stepwise change than that in the first embodiment, and it is possible to more smoothly control the control target.

Third Embodiment

Figure 3:
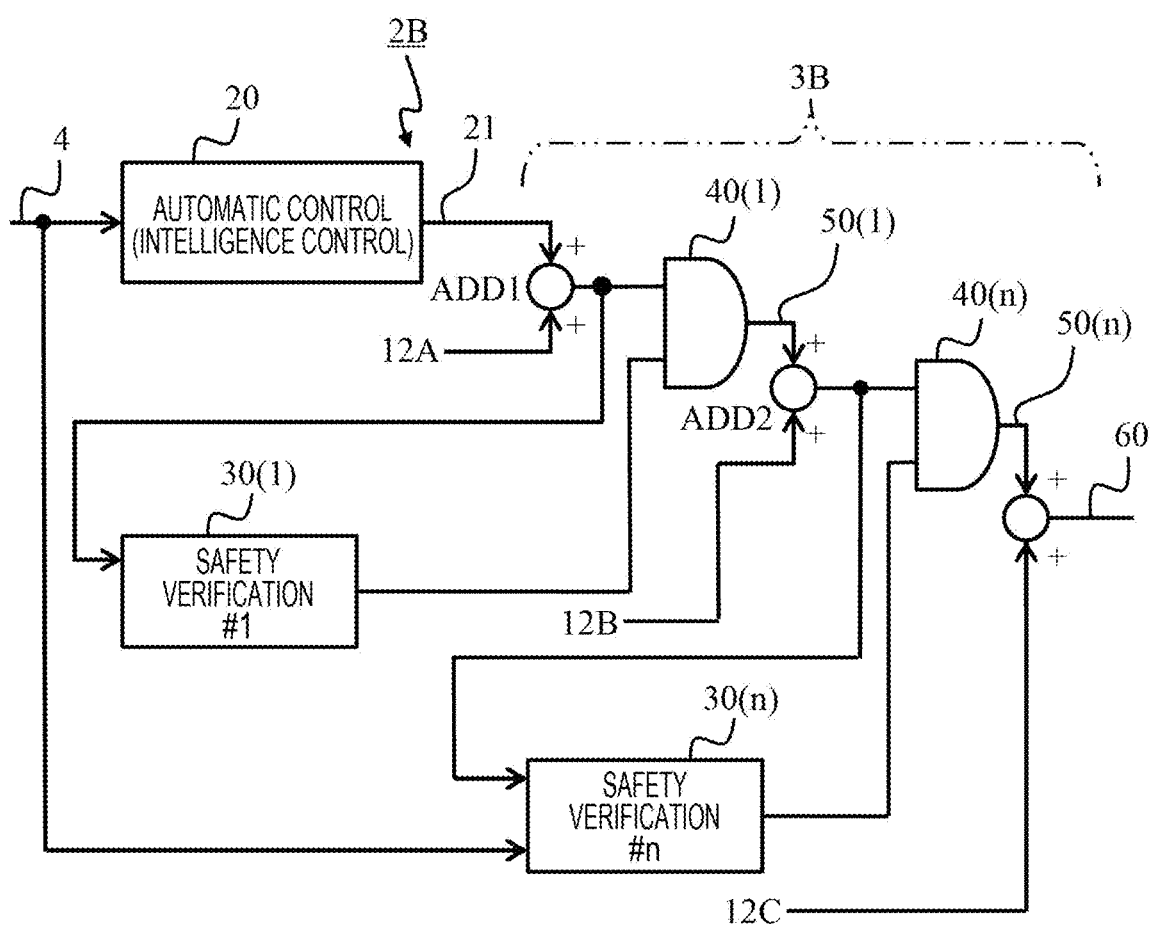
FIG. 3 is a block diagram illustrating a configuration of a control device according to a third embodiment.

A third embodiment will be described with reference to FIG. 3. In a control device 2B of the present embodiment, a plurality of safety verification units 30(1) to 30(n) and a plurality of AND gates 40(1) to 40(n) are provided in an output control unit 3B.

Outputs 50(1) to 50(n) of the AND gates 40(1) to 40(n) are respectively controlled by outputs of the safety verification units 30(1) to 30(n). The control output 60 is generated by adding manipulation quantity information 12C to the safety restriction output 50 (n) from the AND gate 40 (n) at the final stage.

When the same determination logic is implemented in the safety verification units 30(1) to 30(n), the safety verification units 30(1) to 30 (n) function as a redundant system. Therefore, in this case, the safety of the control output 60 can be ensured even when any one or a plurality of safety verification units fails.

Meanwhile, different determination logics can be implemented in the safety verification units 30(1) to 30(n). In this case, the design of the safety verification unit can be diversified, and thus, it is possible to prevent a detection failure depending on the determination logic. For example, a determination logic based on artificial intelligence such as deep learning is implemented in at least one of the safety verification units 30(1) to 30(n), and a determination logic based on a rule is further implemented in at least one thereof. Accordingly, it is possible to achieve both abnormality (dangerous event) detection exceeding human knowledge due to artificial intelligence and accountability (answerability) based on a certain rule.

The output control unit 3B may be constituted with consideration for false-negative probabilities (events in which the safety verification unit is normal but is erroneously determined to be abnormal (dangerous)) of the safety verification units 30(1) to 30(n). When the safety verification unit having a highest false-negative probability is the safety verification unit 30(1) and the safety verification units 30(2), 30(3), . . . have false-negative probabilities in descending order, the safety verification unit having a higher false-negative probability is bypassed when the priority information is lower, and the safety verification unit having a lower false-negative probability is bypassed when the priority information is higher.

The present embodiment having the aforementioned configuration also acquires the same effects as those of the first and second embodiments. In the present embodiment, the safety verification units 30(1) to 30 (n) and the AND gates 40(1) to 40(n) are provided in multiple stages, and thus, the usability and reliability can be further improved.

Fourth Embodiment

Figure 4:
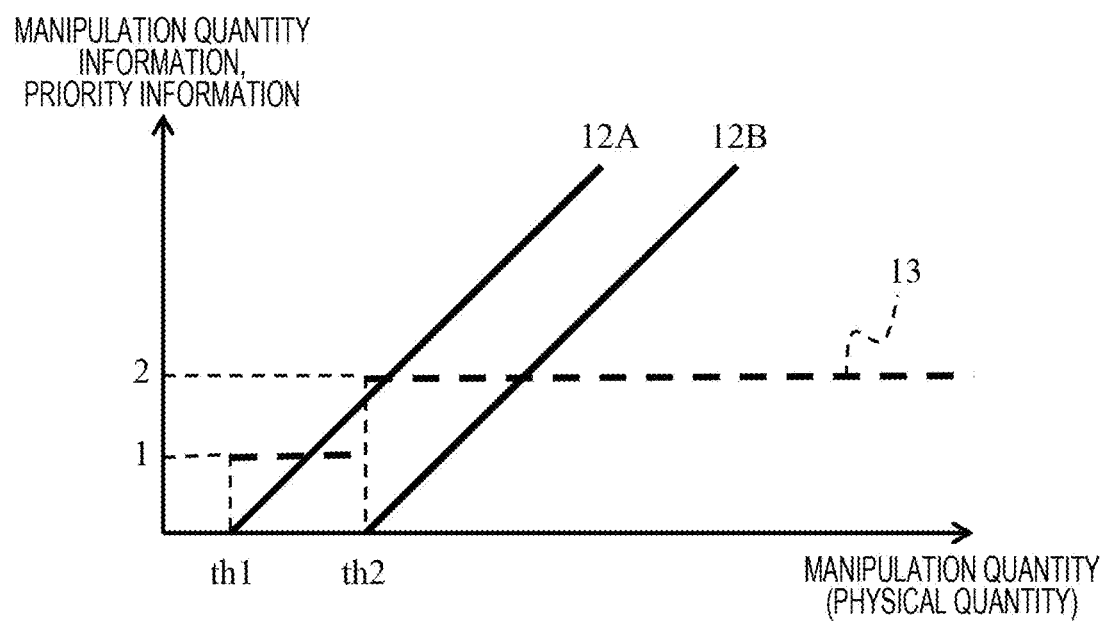
FIG. 4 is a graph representing a relationship between a manipulation quantity, and manipulation quantity information and priority information according to a fourth embodiment.
Figure 7:
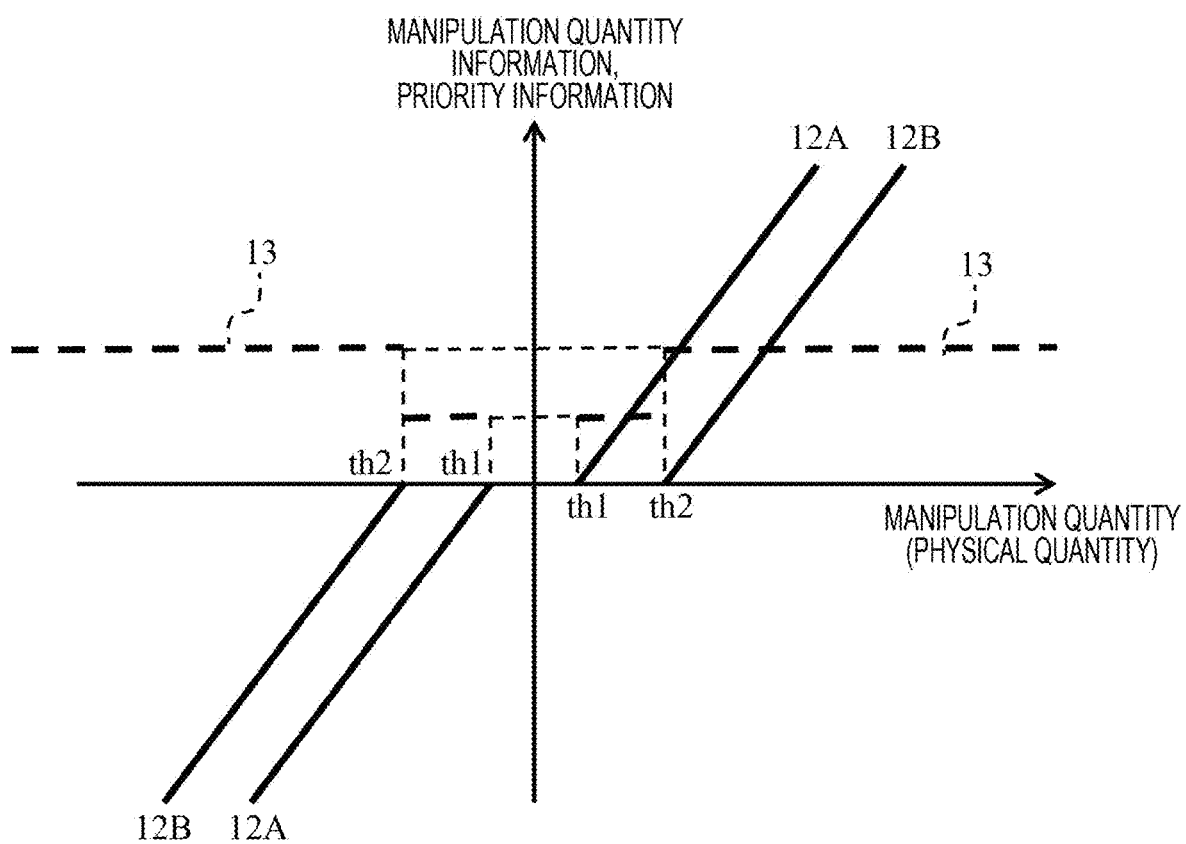
FIG. 7 is a graph representing the relationship between the manipulation quantity, and the manipulation quantity information and the priority information when a mechanism of a manipulation interface unit is different.
Figure 8:
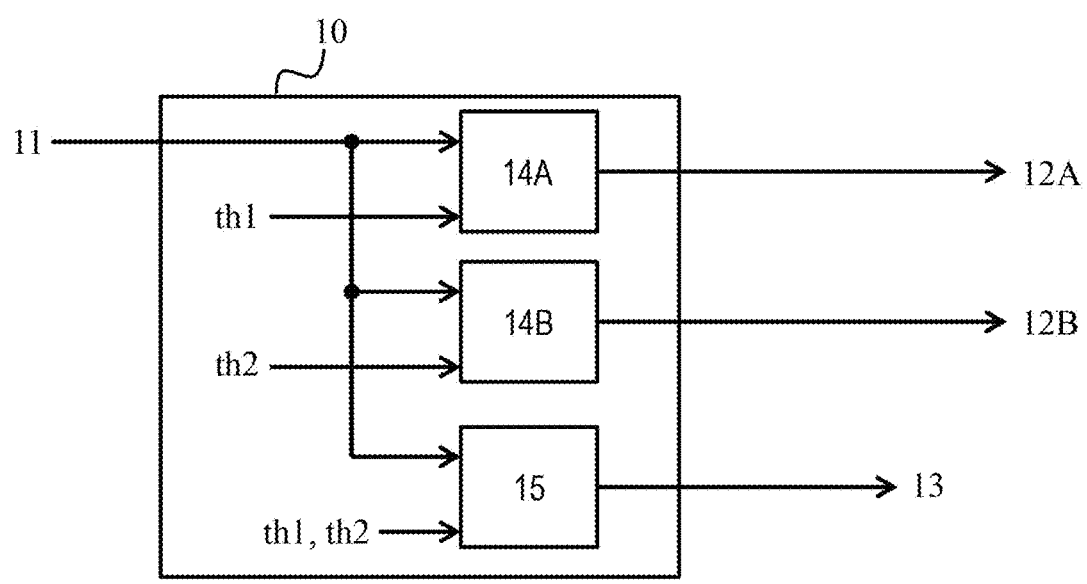
FIG. 8 is a block diagram of the manipulation interface unit.

A fourth embodiment will be described with reference to FIGS. 4 to 9. FIGS. 4 and 8 are examples in which the manipulation interface 10 generates the priority information 13 according to the magnitude of the manipulation quantity (physical quantity) 11.

FIG. 4 illustrates a relationship between the manipulation quantity 11, the manipulation quantity information 12A and 12B, and the priority information 13. When the manipulation quantity 11 exceeds predetermined thresholds th1 and th2, the manipulation quantity information 12A and 12B having values proportional to the manipulation quantity 11 are generated. When the manipulation quantity 11 exceeds the threshold th1, the first value "1" is given as the priority information 13, and when the manipulation quantity 11 exceeds the threshold th2, the second value "2" is given.

Figure 5:
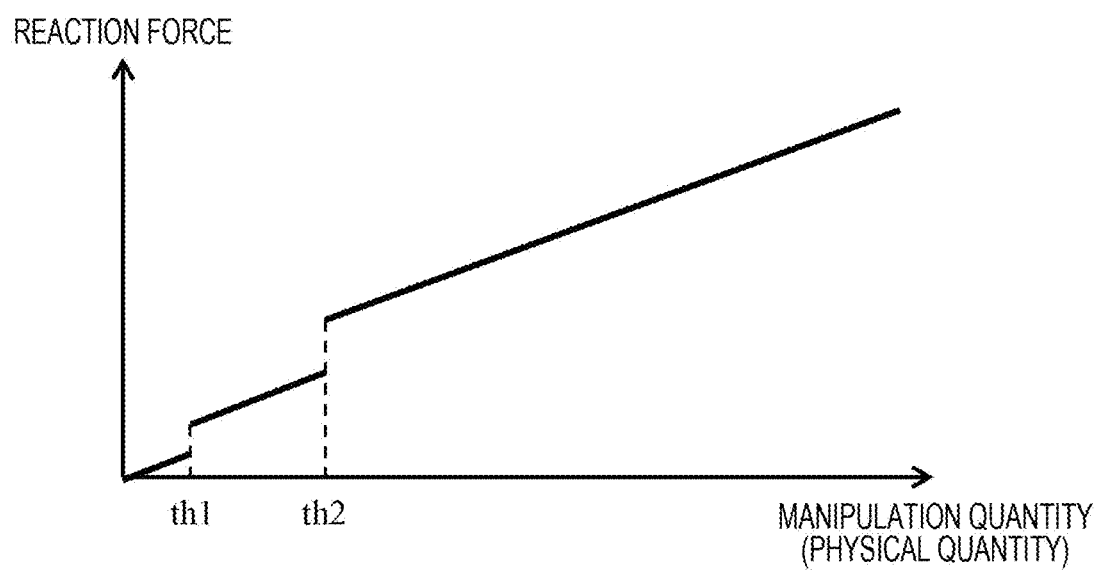
FIG. 5 is a graph representing a relationship between a manipulation quantity and a reaction force.

FIG. 5 illustrates a relationship between the manipulation quantity 11 and a reaction force. As illustrated in FIG. 5, a stepwise difference occurs in the reaction force in that the manipulation quantity 11 is equal to the threshold values th1 and th2. Accordingly, the user can recognize whether or not the manipulation quantity 11 input to the manipulation interface unit 10 is equal to or greater than the threshold values th1 and th2, and can eventually recognize the input priority information 13 through a sense of touch.

Figure 6:
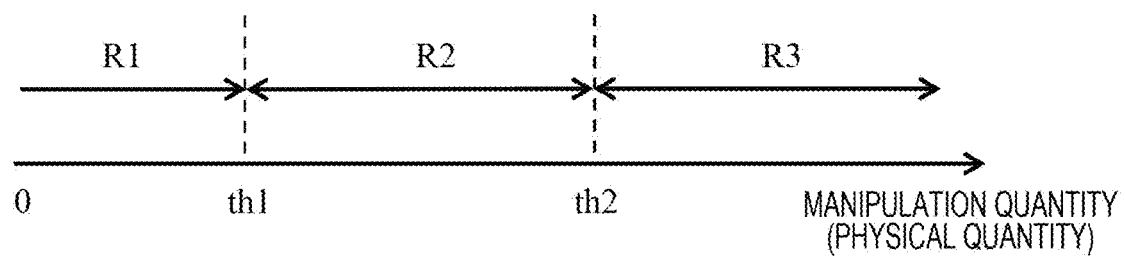
FIG. 6 is an explanatory diagram illustrating a relationship between the magnitude of the manipulation quantity (priority information) and an operation mode of a control output.

FIG. 6 is an explanatory diagram illustrating a relationship between the magnitude of the manipulation quantity 11 (priority information) and the operation mode of the control output. When the manipulation quantity 11 is less than the threshold th1 (R1), the automatic control output 21 becomes the control output 60 under the restriction of the safety verification unit 30. When the user adds the manipulation quantity 11 which is equal to or greater than the threshold th1 and is less than the threshold th2 to the manipulation interface 10 (R2), the user can perform the override within a range permitted by the safety verification unit 30. When the user adds the manipulation quantity 11 which is equal to or greater than the threshold th2 to the manipulation interface unit 10 (R3), the user can perform the override regardless of the safety verification unit 30.

FIG. 4 illustrates an example in which the manipulation quantity 11 is changed in one direction (for example, a manipulation of a brake pedal or an accelerator pedal). FIG. 7 is an example in which the manipulation quantity is changed in both directions with a neutral point as a center (for example, steering manipulation).

In the case illustrated in FIG. 7, the manipulation quantity information 12A and 12B and the priority information 13 may also be generated by comparing an absolute value of the manipulation quantity 11 with the thresholds th1 and th2, as in FIG. 4. Similarly to FIG. 5, as for the reaction force, a stepwise difference may occur in the reaction force when the total value of the manipulation quantity 11 is equal to the threshold values th1 and th2. Accordingly, the user can recognize whether or not the manipulation quantity 11 added to the manipulation interface unit 10 is equal to or greater than the threshold values th1 and th2, and can eventually recognize the priority information 13 to be generated through the sense of touch.

FIG. 8 is a configuration example of the manipulation interface unit 10. The manipulation interface unit 10 includes, for example, conversion units 14A and 14B, and a priority generation unit 15.

The first conversion unit 14A is a circuit that converts the manipulation quantity 11 into the manipulation quantity information 12A input to the first switch SW1 or the first addition unit ADD1. The first conversion unit 14A generates the manipulation quantity information 12A corresponding to the manipulation quantity 11 by comparing the manipulation quantity 11 with the first threshold th1. Similarly, the second conversion unit 14B is a circuit that converts the manipulation quantity 11 into the manipulation quantity information 12B input to the second switch SW2 or the second addition unit ADD2. The second conversion unit 14B generates the manipulation quantity information 12B corresponding to the manipulation quantity 11 by comparing the manipulation quantity 11 with the second threshold th2. Although FIG. 8 illustrates two conversion units 14A and 14B, the present invention is not restricted thereto, and the manipulation interface unit 10 may include three or more conversion units.

The priority generation unit 15 is a circuit that generates the priority information 13 from the manipulation quantity 11. The priority generation unit 15 generates the priority information 13 corresponding to a value of the manipulation quantity 11 by comparing the manipulation quantity 11 with the threshold values th1 and th2.

Figure 9:
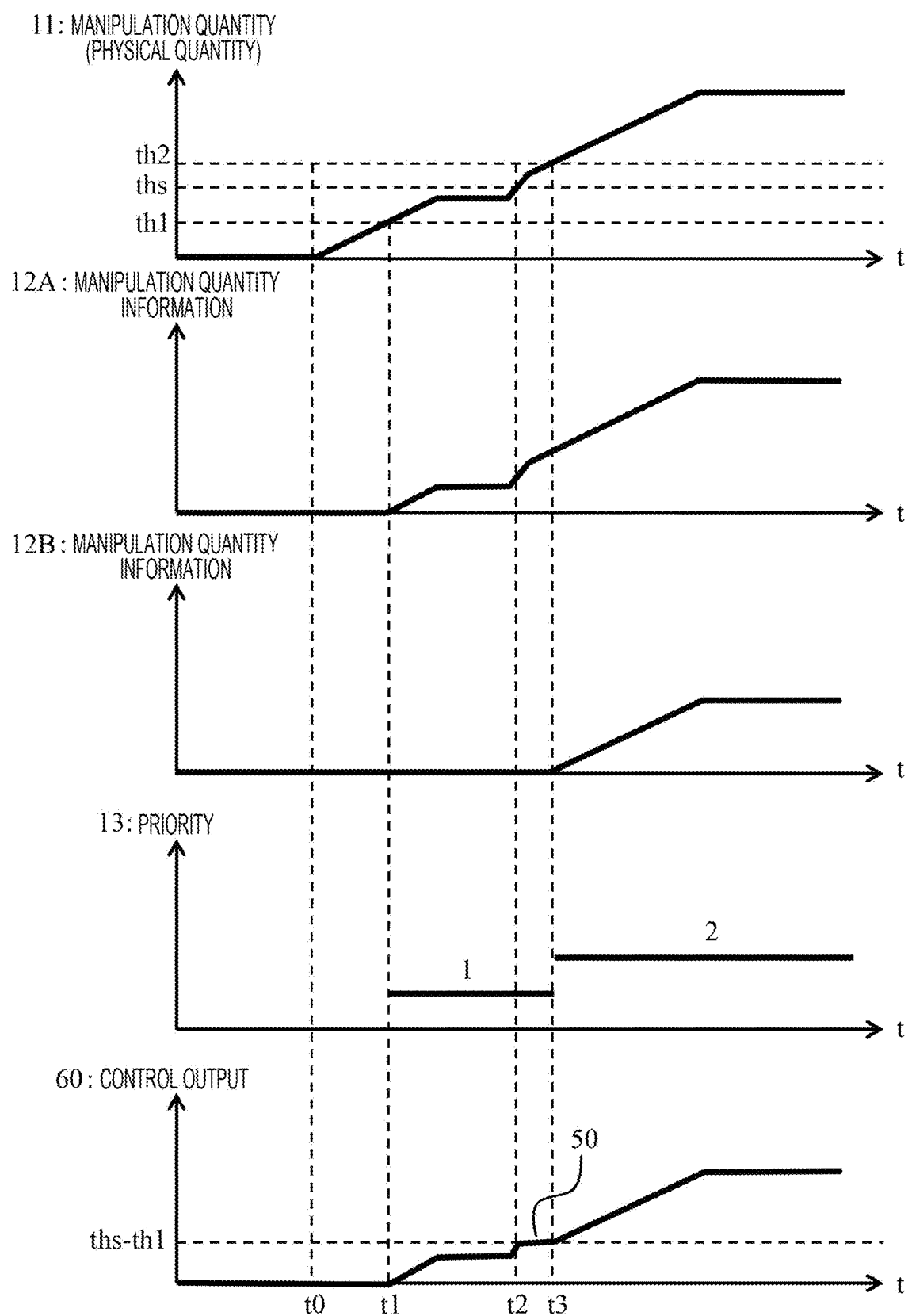
FIG. 9 is a graph representing temporal changes in the relationship between the manipulation quantity, the manipulation quantity information, the priority information, and the control output.

FIG. 9 is a graph illustrating an example of temporal changes in the manipulation quantity 11, the manipulation quantity information 12A and 12B, the priority information 13, and the control output 60.

In FIG. 9, it is assumed that the manipulation quantity 11 starts to be input after time t0 and reaches the threshold th1 after time t1. When the manipulation quantity 11 is equal to or greater than the threshold th1, the manipulation quantity information 12A is greater than "0", and the priority information 13 is "1". As a result, the manipulation quantity information 12A is output as the control output 60.

Thereafter, when the manipulation quantity 11 further increases and exceeds a safety restriction output threshold ths at time t2, the control output 60 is restricted to the safety restriction output 50 until time t3 when the physical quantity 11 is equal to or greater than the threshold th2.

It is assumed that the physical quantity 11 further increases and reaches the threshold th2 at time t3. When the manipulation quantity 11 is equal to or greater than the threshold th2, the priority information 13 is changed from "1" to "2". Thus, after time t3, a value obtained by adding the manipulation quantity information 12B to the safety restriction output 50 is output as the control output 60.

The safety restriction output threshold ths of a target speed Vs during automatic driving is determined such that a relative speed (Vs−Vo) to an obstacle is less than a predetermined speed from a distance 1 to the obstacle is less than a predetermined speed. For example, in a condition in which a vehicle stops when (Vs-Vo) is zero at a constant acceleration (deceleration) a, these speeds are expressed as Equations 2 and 3.

$(Vs-Vo)=SQRT(2a1)$ (Equation 2)

$Vs=SQRT(2a1)+Vo$ (Equation 3)

where, Vs: upper limit of target speed of host vehicle Vo: speed of obstacle

When the control system 1 is applied to aircraft control, a stalling speed can be used as a lower limit of the safety restriction output threshold ths, and a maximum operating speed can be used as an upper limit.

According to the present embodiment having the aforementioned configuration, (1) the operation mode in which the operation is performed based on automatic control, (2) the operation mode in which the override operation is permitted under the restriction of the safety verification unit 30, and (3) the operation mode in which the override operation is permitted regardless of the restriction of the safety verification unit 30 can be switched by the user manipulation depending on the situation, as described above.

Fifth Embodiment

Figure 10:
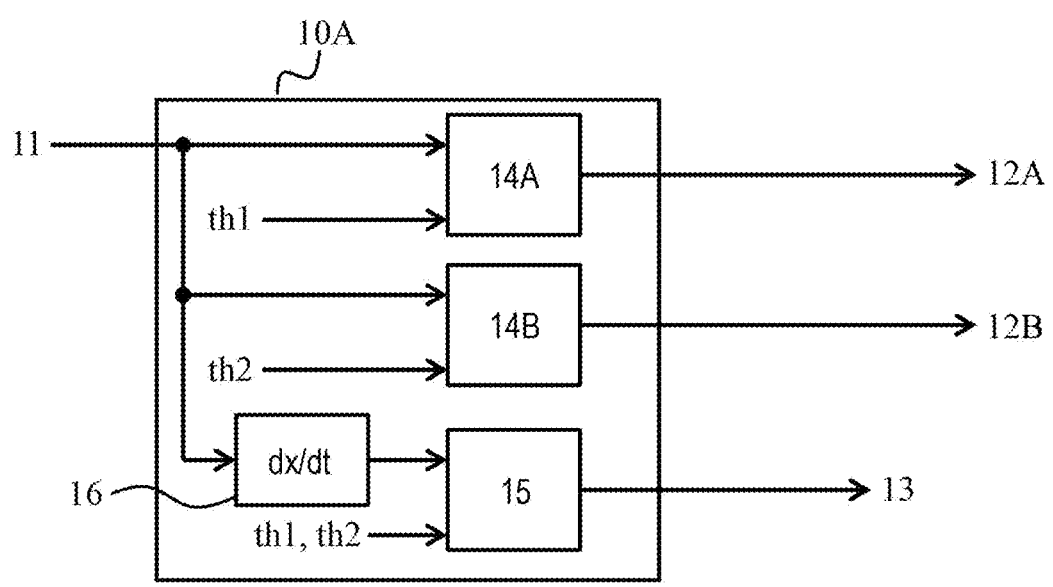
FIG. 10 is a block diagram of a manipulation interface unit according to a fifth embodiment.

A fifth embodiment will be described with reference to FIG. 10. FIG. 10 is a configuration diagram of a manipulation interface unit 10A of the present embodiment. The manipulation interface unit 10A of the present embodiment generates the priority information 13 according to a differential value of the manipulation quantity 11.

The manipulation interface unit 10A includes a differentiator circuit 16 in addition to the conversion units 14A and 14B and the priority generation unit 15. A value obtained by differentiating the manipulation quantity 11 by the differentiator circuit 16 is input to the priority generation unit 15. The priority generation unit 15 generates the priority information 13 by comparing the differential value of the manipulation quantity 11 with the thresholds th1 and th2.

The present embodiment having the aforementioned configuration also acquires the same effects as those of the first embodiment. According to the present embodiment, since the priority information 13 is generated from the differential value of the manipulation quantity 11, a temporal change in the manipulation quantity can be detected. Thus, in the present embodiment, the urgency of the manipulation can be estimated from the differential value of the manipulation quantity 11, and the value of the priority information 13 can be set to be higher as the manipulation with higher urgency.

Sixth Embodiment

Figure 11:
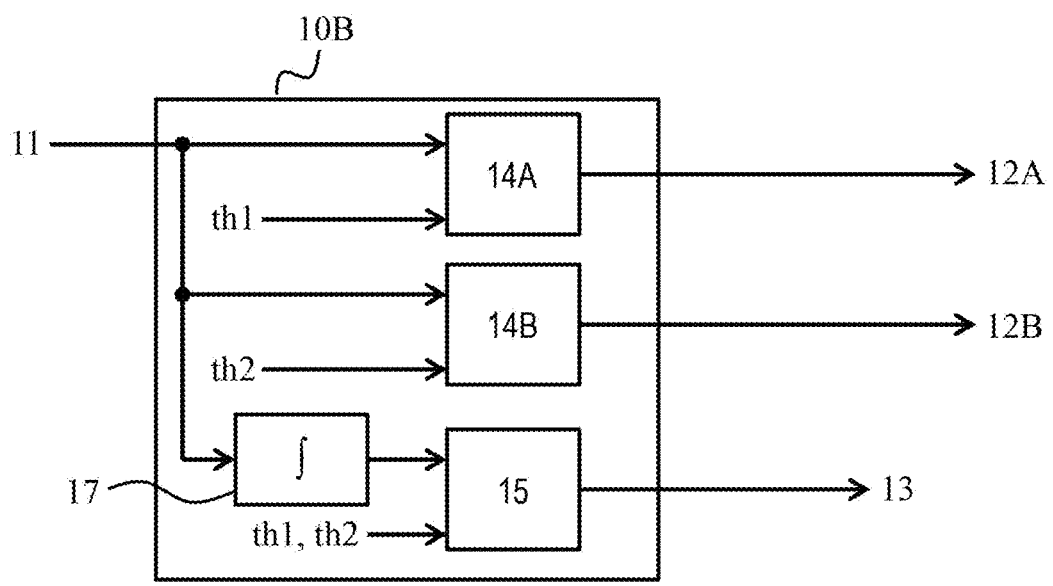
FIG. 11 is a block diagram of a manipulation interface unit according to a sixth embodiment.

A sixth embodiment will be described with reference to FIG. 11. FIG. 11 is a configuration diagram of a manipulation interface unit 10B of the present embodiment. The manipulation interface unit 10B of the present embodiment generates the priority information 13 according to an integral value of the manipulation quantity 11. In the present embodiment, an integrator circuit 17 is provided instead of the differentiator circuit 16 described in FIG. 10.

The integrator circuit 17 inputs the integral value of the manipulation quantity 11 to the priority generation unit 15. The priority generation unit 15 generates the priority information 13 by comparing the integral value of the manipulation quantity 11 with the thresholds th1 and th2.

The present embodiment having the aforementioned configuration also acquires the same effects as those of the first embodiment. According to the present embodiment, since the priority information 13 is generated from the integral value of the manipulation quantity 11, the magnitude and duration of the manipulation can be detected. Thus, in the present embodiment, it is possible to estimate the strength of an intention for the manipulation of the user from the integral value of the manipulation quantity 11, and it is possible to set the value of the priority information 13 to be higher as a manipulation having a stronger intention to operate is performed.

Seventh Embodiment

Figure 12:
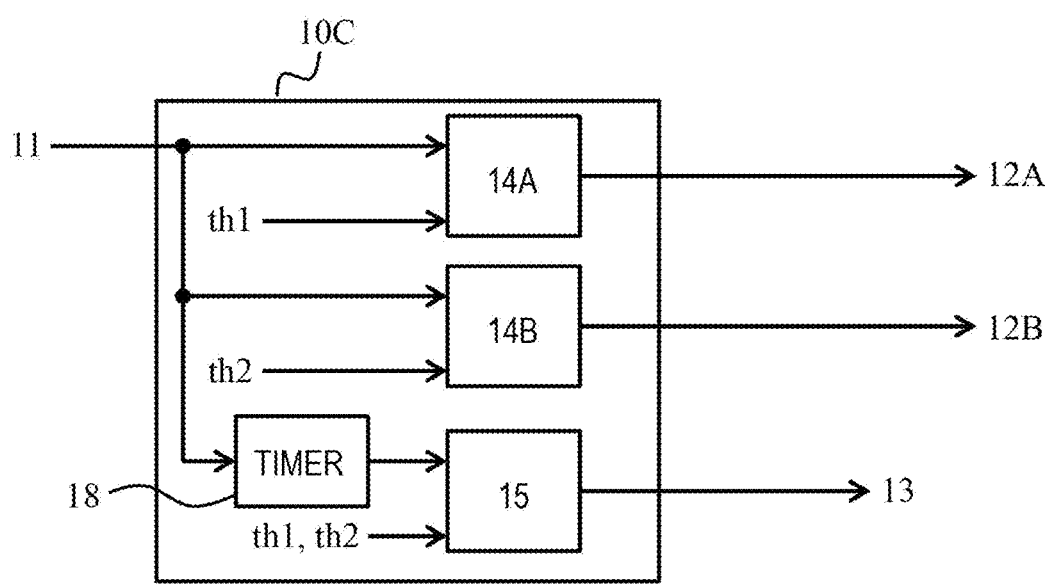
FIG. 12 is a block diagram of a manipulation interface unit according to a seventh embodiment.

A seventh embodiment will be described with reference to FIG. 12. FIG. 12 is a configuration diagram of a manipulation interface unit 10C of the present embodiment. The manipulation interface unit 10C of the present embodiment generates the priority information 13 according to the duration of the manipulation quantity 11. In the present embodiment, a timer 18 is provided instead of the integrator circuit 17 described in FIG. 11.

The timer 18 detects the duration of the manipulation quantity 11, and inputs the detected duration to the priority generation unit 15. The priority generation unit 15 generates the priority information 13 by comparing the duration of the manipulation quantity 11 with the thresholds th1 and th2.

The present embodiment having the aforementioned configuration also acquires the same effects as those of the first embodiment. In the present embodiment, since the certainty of the intention of the user can be estimated from the duration of the manipulation quantity 11, it is possible to set the priority information 13 to a higher value as a manipulation with a certain intention is performed.

Eighth Embodiment

Figure 13:
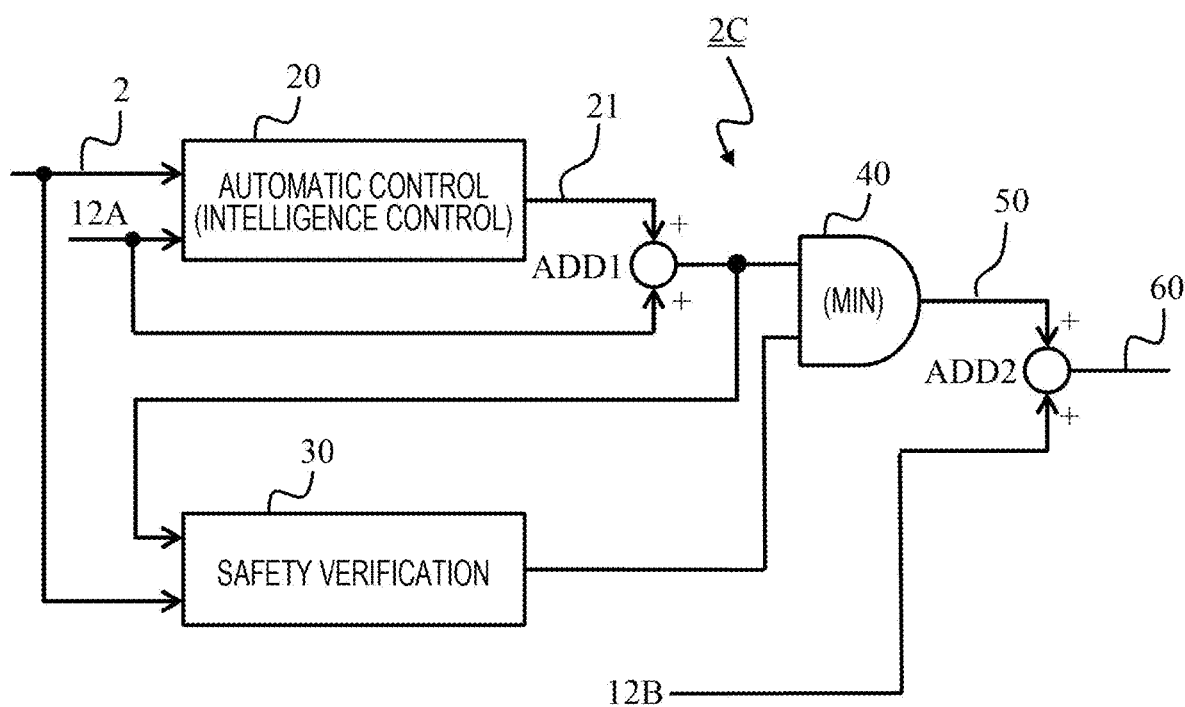
FIG. 13 is a block diagram of a control device according to an eighth embodiment.
Figure 14:
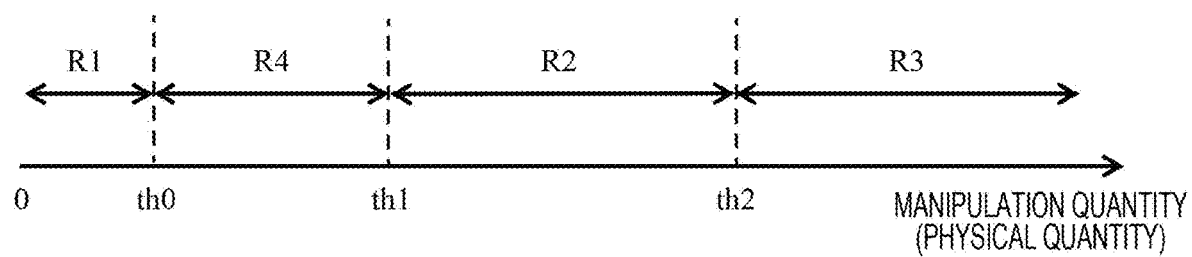
FIG. 14 is an explanatory diagram illustrating a relationship between the magnitude of a manipulation quantity (priority information) and an operation mode of a control output.

An eighth embodiment will be described with reference to FIGS. 13 and 14. FIG. 13 is a configuration example of a control device 2C according to the present embodiment. FIG. 14 is an explanatory diagram illustrating a relationship between the magnitude of the manipulation quantity (priority information) and the operation mode of the control output.

In the automatic control unit 20 of the present embodiment, when the input manipulation quantity information 12A is equal to or greater than a predetermined threshold th0 and is less than the threshold th1 (R4), a target trajectory is selected in a direction in which the intention is reflected by the quantity information 12A input to the automatic control unit 20.

In the present embodiment, as in the example illustrated in FIG. 7, the user can the override within a range allowed by the safety verification unit 30 by giving the manipulation quantity 11 equal to or greater than the threshold th1 to the manipulation interface unit 10 (R2). When the user adds a manipulation quantity 11 equal to or greater than the threshold th2 to the manipulation interface unit 10 (R3), the user can perform an override operation unrelated to the safety verification unit 30.

According to the present embodiment having the aforementioned configuration, the operation mode (R1) in which the operation is performed based on the automatic control output 21, the operation mode (R4) in which the operation is performed based on the automatic control output 21 and the target trajectory is selected in the direction in which the intention of the user is reflected, the mode (R2) in which the override is permitted in a range in which the safety is confirmed, and the mode (R3) in which the override operation can be performed regardless of the safety verification can be realized.

Ninth Embodiment

Figure 15:
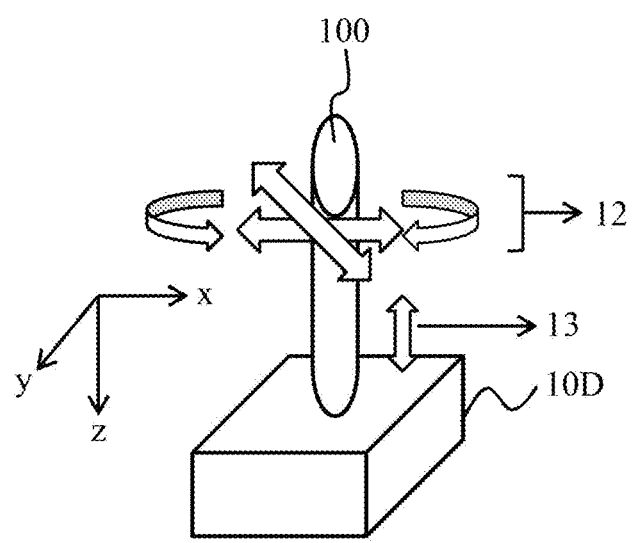
FIG. 15 is an explanatory diagram of a manipulation interface unit according to a ninth embodiment.

A ninth embodiment will be described with reference to FIG. 15. In the present embodiment, a degree of freedom of a manipulation of a manipulation interface unit 10D is increased, and the priority information 13 is generated with a degree of freedom of a manipulation independent of a degree of freedom of a manipulation allocated to the original manipulation quantity 11.

The manipulation interface unit 10D of the present embodiment sets an operation in an x-y plane as an original manipulation direction. That is, the user can input the manipulation quantity 11 by tilting a manipulation lever 100 in an x direction or a y direction or rotating the manipulation lever in a clockwise direction or a counterclockwise direction about a rotation axis. The user can generate the priority information 13 by pushing or pulling the manipulation lever 100 in a z direction independent of the manipulation direction.

The present embodiment having the aforementioned configuration also acquires the same effects as those of the first embodiment. According to the manipulation interface unit 10D of the present embodiment, the priority information 13 is not calculated from the magnitude of the manipulation quantity 11, but the priority information 13 can be generated by a predetermined manipulation independent of a normal manipulation. Accordingly, the manipulation intention of the user can be clearly input to the control device 2.

Tenth Embodiment

Figure 16:
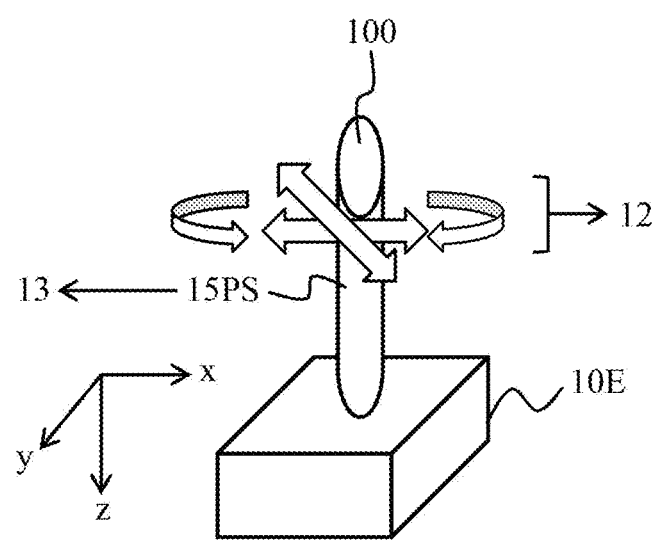
FIG. 16 is an explanatory diagram of a manipulation interface unit according to a tenth embodiment.

A tenth embodiment will be described with reference to FIG. 16. FIG. 16 is a configuration example of a manipulation interface unit 10E of the present embodiment. In the present embodiment, it is assumed that the operation in the x-y plane is the manipulation direction for generating the manipulation quantity 11. In the present embodiment, a pressure sensor 15PS independent of the manipulation direction is provided at the manipulation lever 100. A pressure when the user holds the manipulation lever 100 is detected by the pressure sensor 15PS. The pressure detected by the pressure sensor 15PS (a holding force for holding the manipulation lever 100) is converted into the priority information 13 by the priority generation unit 15.

The present embodiment having the aforementioned configuration also acquires the same effects as those of the first embodiment. According to the manipulation interface unit 10E of the present embodiment, the user can input the urgency and importance of the manipulation to the control device 2 by firmly holding the manipulation lever 100.

Eleventh Embodiment

Figure 17:
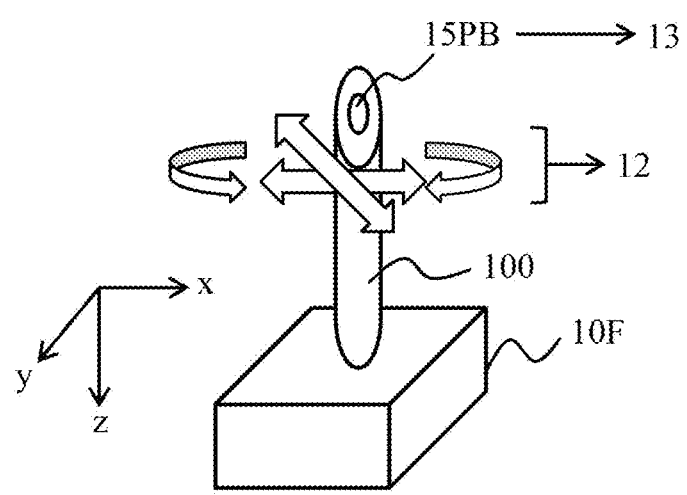
FIG. 17 is an explanatory diagram of a manipulation interface unit according to an eleventh embodiment.

An eleventh embodiment will be described with reference to FIG. 17. FIG. 17 is a configuration example of a manipulation interface unit 10F of the present embodiment. In the present embodiment, it is assumed that the operation in the x-y plane is the manipulation direction for generating the manipulation quantity 11. In the present embodiment, a push button switch 15PB is provided at a top portion or a side portion of the manipulation lever 100. When the user desires the override operation, the user may push the push button switch 15PB. When the push button switch 15PB is a switch capable of being pushed in a multiple stages, the value of the priority information 13 can be changed depending on the quantity pushed by the user.

The present embodiment having the aforementioned configuration also acquires the same effects as those of the first embodiment. According to the present embodiment, the user can instruct the control device 2 to request the override operation by manipulating the push button switch 15PB.

The priority information 13 may be generated by combining some of the pushing or pulling manipulation of the manipulation lever 100, the pressure when the manipulation lever 100 is held, the manipulation of the push button provided at the manipulation lever 100, and the comparison of the manipulation quantity 11 with the threshold values th1 and th2.

Twelfth Embodiment

Figure 18:
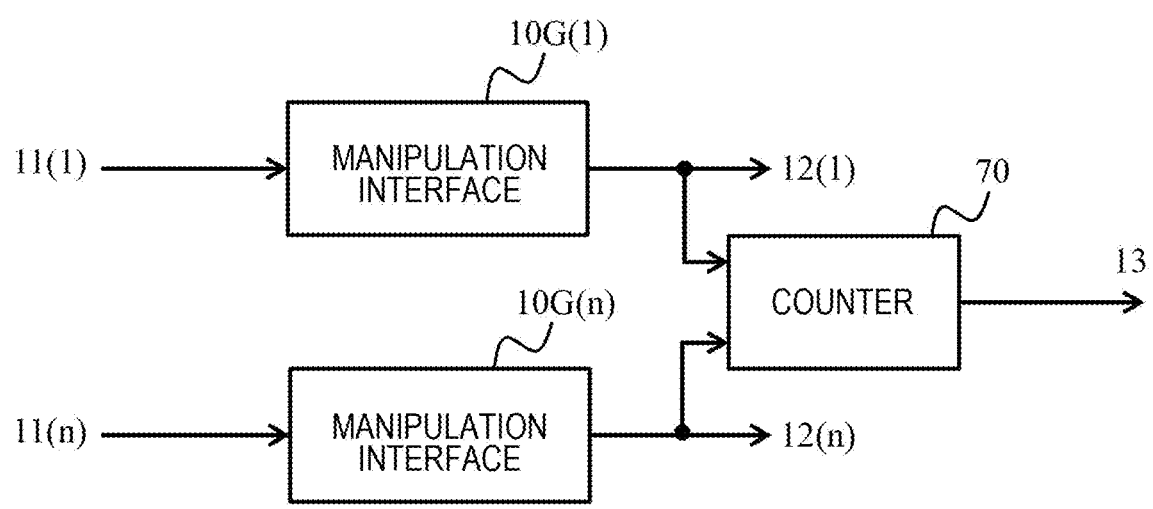
FIG. 18 is an explanatory diagram of a manipulation interface unit according to a twelfth embodiment.

A twelfth embodiment will be described with reference to FIG. 18. FIG. 18 illustrates a configuration example of a manipulation interface unit 10G according to the present embodiment. In the present embodiment, a plurality of manipulation interface units 10G(1) to 10G(n) is provided, and the priority information 13 is generated by summing the manipulation quantities 11 for the manipulation interface units 10G(1) to 10G(n) by a counter 70. Therefore, as many users manipulate the manipulation interface unit 10G in the same direction, the total value of the counter 70 increases, and thus, a higher value is set to the priority information 13.

The present embodiment having the aforementioned configuration also acquires the same effects as those of the first embodiment. In the present embodiment, when the plurality of users operates, the operation mode can be determined by majority.

Thirteenth Embodiment

A thirteenth embodiment will be described with reference to FIGS. 19 to 24. In the present embodiment, a case where the control system is applied to an automatic driving system of a vehicle will be described.

Figure 19:
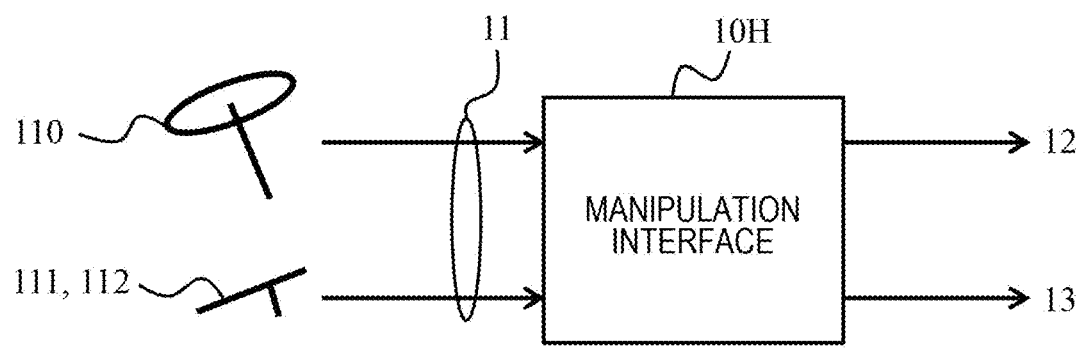
FIG. 19 is an explanatory diagram when the manipulation interface unit is applied to an automatic driving system of a vehicle according to a thirteenth embodiment.

FIG. 19 illustrates an example in which a manipulation interface unit 10H is applied to the automatic driving system. The manipulation interface unit 10H receives, as the manipulation quantity 11, a steering angle or steering torque 110, an accelerator pedal angle 111, and a brake pedal angle 112.

Figure 20:
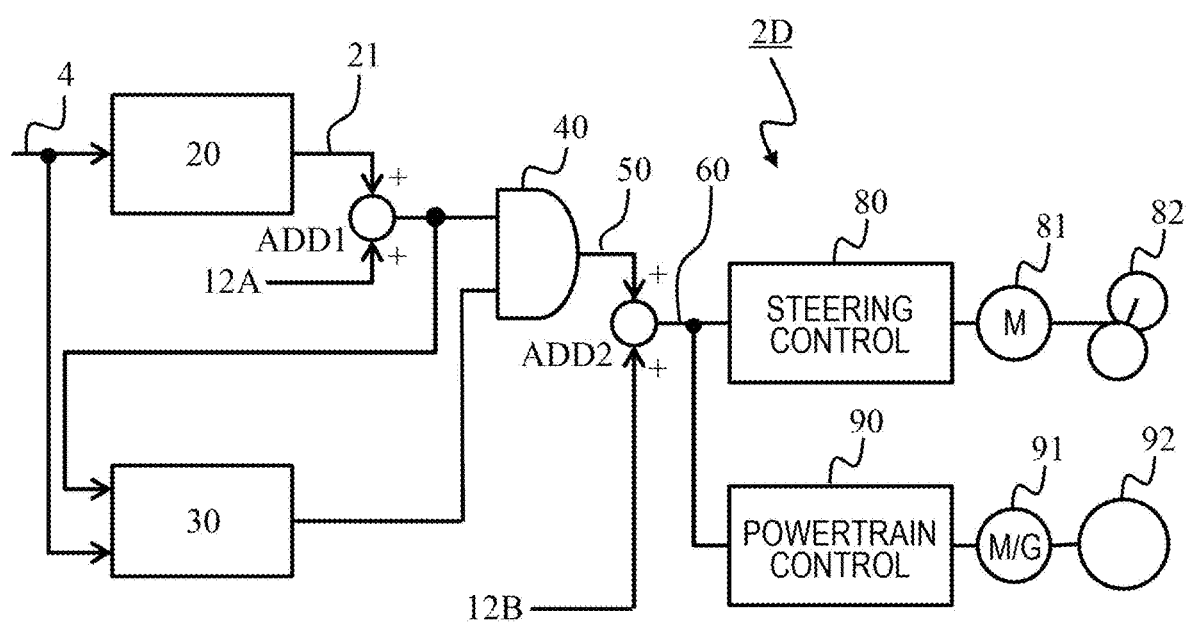
FIG. 20 is an explanatory diagram when the control device is applied to an automatic driving system of a vehicle.

FIG. 20 is an example in which a control device 2D of the present embodiment is applied to the automatic driving system. The control output 60 output from the control device 2D is input to a steering control unit 80 and a powertrain control unit 90.

In an automatic control mode according to the automatic control output 21, the steering control unit 80 controls a steering unit 82 by a motor 81 according to the control output 60. Similarly, in the automatic control mode, the powertrain control unit 90 controls an acceleration or a deceleration of a drive wheel 92 by a motor generator 91 according to the control output 60.

In an override mode, the steering control unit 80 controls the steering unit 82 by the motor 81 based on the steering angle or steering torque 110. Similarly, in the override mode, the powertrain control unit 90 controls the acceleration or deceleration of the drive wheel 92 by the motor generator 91 based on the accelerator pedal angle 111 and the brake pedal angle 112. As described above, the override mode includes a mode in which the operation is restricted by the safety verification unit 30 and a mode in which the operation is not restricted by the safety verification unit 30.

Figure 21:
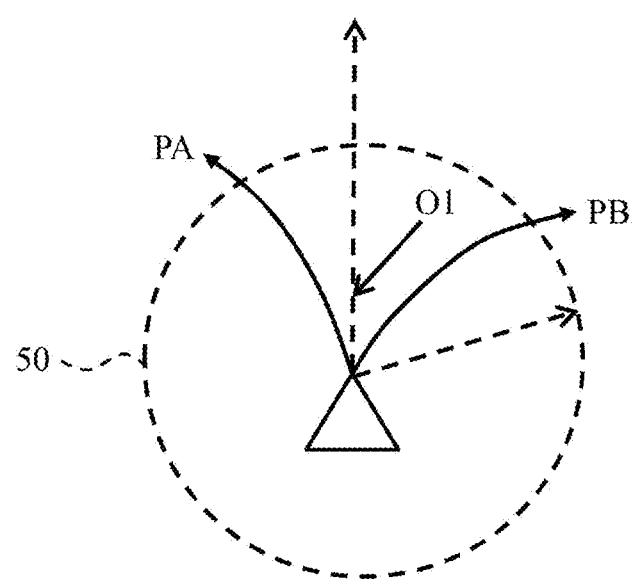
FIG. 21 is an explanatory diagram illustrating an example in which the vehicle avoids an obstacle.

FIG. 21 is an explanatory diagram illustrating a scene in which when an obstacle O1 approaches the host vehicle (Δ mark) during automatic driving, the vehicle avoids the obstacle toward any one of a route PA or a route PB by an override manipulation of the user.

Figure 22:
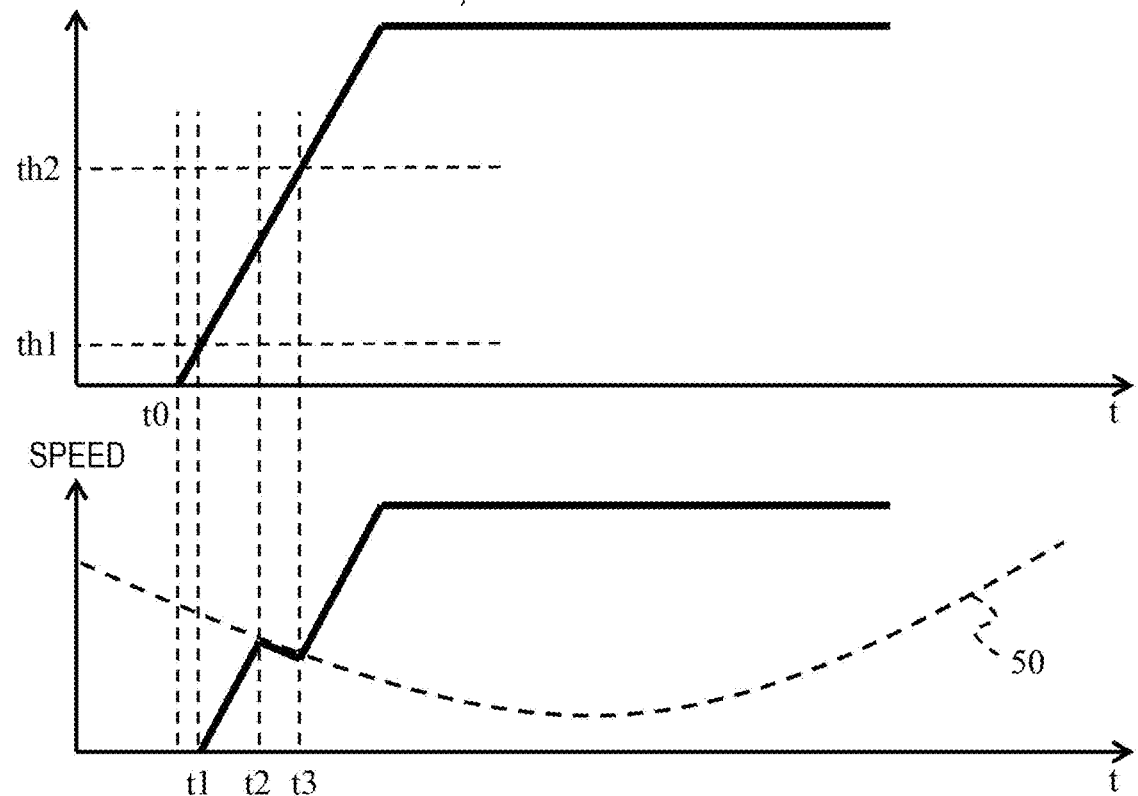
FIG. 22 is a graph representing temporal changes in the relationship between the manipulation quantity and the control output.

FIG. 22 is a graph representing temporal changes of the manipulation quantity 11 (accelerator pedal angle 111) and the control output 60 (target speed) during the obstacle avoidance illustrated in FIG. 21.

When the manipulation quantity 11 starts to be input from time t0 and the manipulation quantity 11 reaches the first threshold th1 at time t1, the override is started. As a result, the manipulation quantity of the override appears in the control output 60 (target speed). Since the obstacle O1 is included in a region of the safety restriction output 50 of the host vehicle, the speed of the host vehicle is restricted by the safety restriction output 50 of the safety verification unit 30 (depending on a distance to the obstacle OD after time t2. In this case, the host vehicle needs to avoid the obstacle O1 at a low speed restricted by the safety restriction output 50.

However, when the user steps on the accelerator pedal 111 at time t3 and the manipulation quantity 11 reaches the second threshold th2, the restriction of the speed using the safety verification unit 30 is canceled. As a result, the host vehicle can avoid the obstacle O1 at a speed higher than the speed restricted by the safety restriction output 50.

As described above, even when the manipulation interface is applied to the automatic driving system, the user can switch between an automatic driving mode based on the automatic control output 21, a first override manipulation in which the override manipulation of the user is permitted in the range in which the safety is confirmed by the safety verification unit 30, and a second override mode in which the user can perform the override manipulation without being restricted by the safety verification unit 30 depending on a traffic situation.

Figure 23:
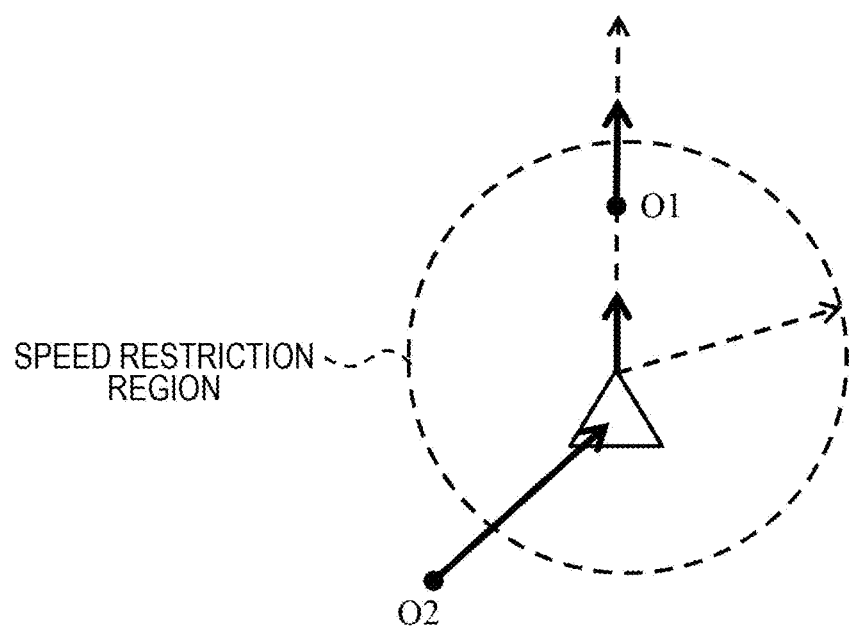
FIG. 23 is an explanatory diagram illustrating another example in which the vehicle avoids the obstacle.
Figure 24:
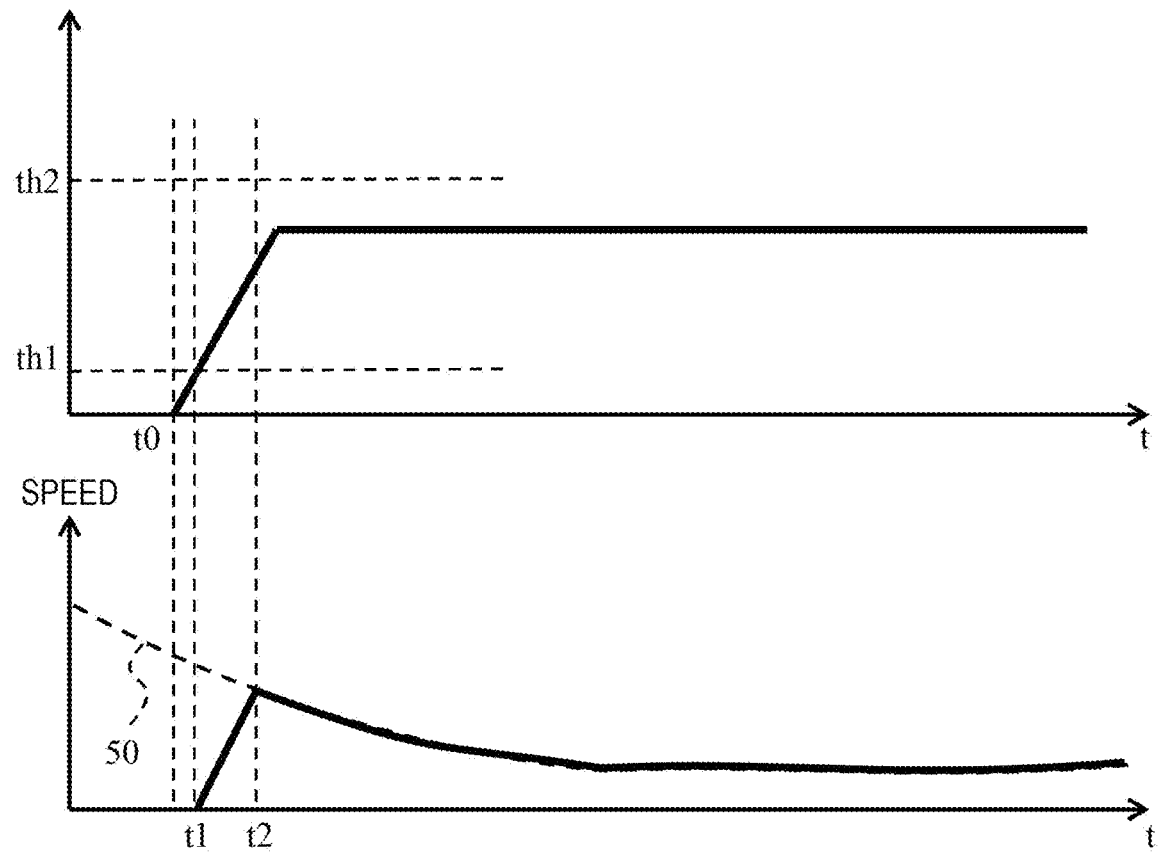
FIG. 24 is a graph representing temporal changes in the relationship between the manipulation quantity and the control output.

FIGS. 23 and 24 are explanatory diagrams illustrating a scene in which the vehicle avoids the obstacle by the override manipulation of the user during the automatic driving when the obstacle O1 is present in front of the host vehicle (A) and an obstacle O2 approaches from a read side of the host vehicle.

As illustrated in FIG. 24, when the manipulation quantity 11 (accelerator pedal angle 111) starts to be input from time t0 and reaches the first threshold value th1 at time t1, the override is started. As a result, the override manipulation quantity of the user is added to the control output 60 (target speed).

After time t1, the manipulation quantity 11 which is equal to or greater than the first threshold th1 and is less than the second threshold th2 continues to be input. In this case, the speed of the host vehicle is restricted by the safety restriction output 50 of the safety verification unit 30 (depending on the distance to the obstacle O1). As a result, it is possible to reduce the distance to the obstacle O1 such that the host vehicle does not collide with the obstacle O1 present in the front of the host vehicle, and it is possible to avoid a situation in which the obstacle O2 present in the rear of the host vehicle collides with the host vehicle.

Fourteenth Embodiment

A fourteenth embodiment will be described with reference to FIG. 25. In the present embodiment, the priority information 13 is generated by using not only the user manipulation but also biological information such as a facial expression and a pulse of the user.

Figure 25:
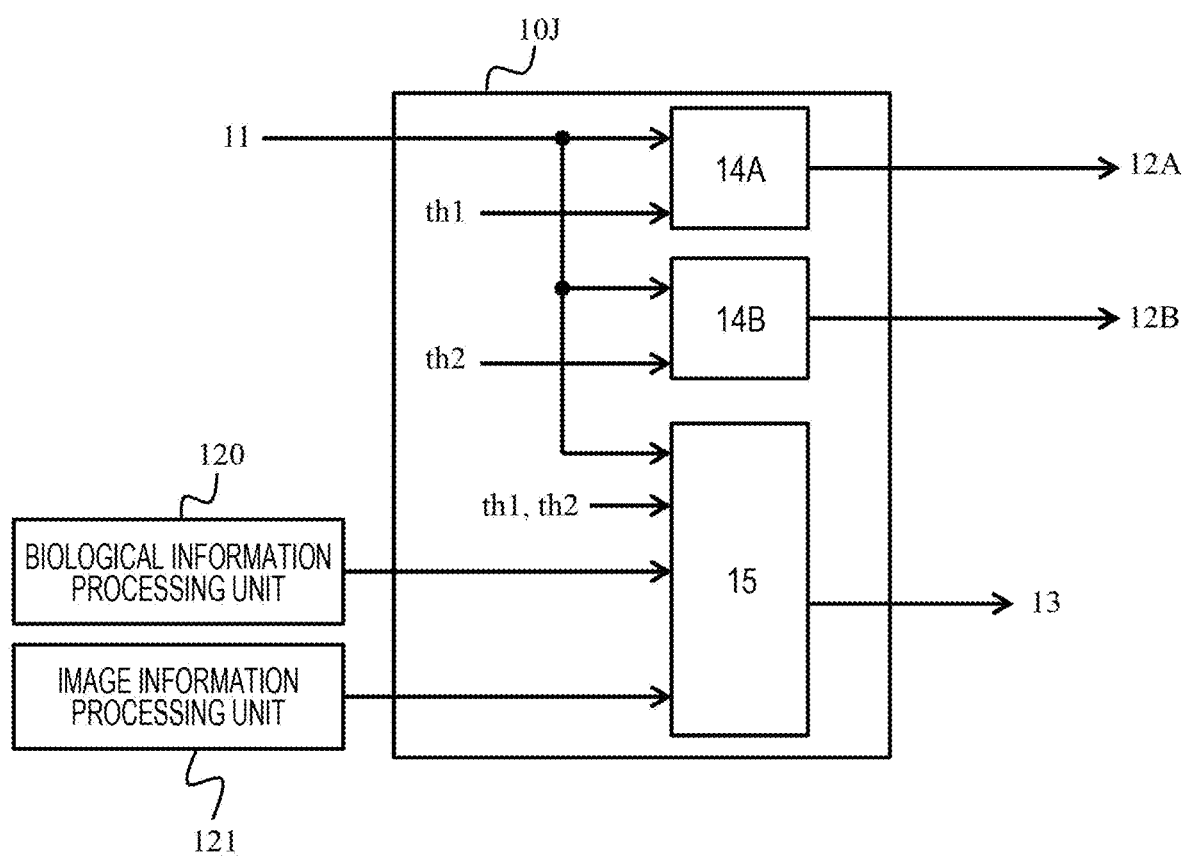
FIG. 25 is a block diagram of a manipulation interface unit according to a fourteenth embodiment.

FIG. 25 is a configuration example of a manipulation interface unit 10J of the present embodiment. In addition to the manipulation quantity 11 and the threshold values th1 and th2, outputs from a biological information processing unit 120 and an image information processing unit 121 are input to the priority generation unit 15 of the manipulation interface unit 10J.

The biological information processing unit 120 acquires, for example, biological information such as a pulse, a blood pressure, a body temperature, or brain waves of the user (driver) from a sensor (not illustrated), and inputs the processing result of the biological information to the priority generation unit 15.

The image information processing unit 121 acquires, for example, the facial expression (sleeping, waking-up, or nervous) of the user or the movement of the head or neck of the user from a camera (not illustrated), and inputs the processing result of the acquired image to the priority generation unit 15.

The priority generation unit 15 generates the priority information 13 based on the relationship indicating whether or not the manipulation quantity 11 is equal to or greater than the thresholds th1 and th2 and the biological information and image information of the user. Accordingly, for example, even though the manipulation quantity 11 is less than the first threshold th1, when it is determined that the user is not able to apply a force into the manipulation due to a sudden illness, it is possible to permit the override manipulation of the user in a range in which safety is ensured by the safety verification unit 30. Alternatively, even though the manipulation quantity 11 of the user does not reach the second threshold th2, when it is determined that the facial expression or heart rate of the user is an emergency situation, it is possible to permit the override manipulation of the user without being restricted by the safety verification unit 30.

Fifteenth Embodiment

Figure 26:
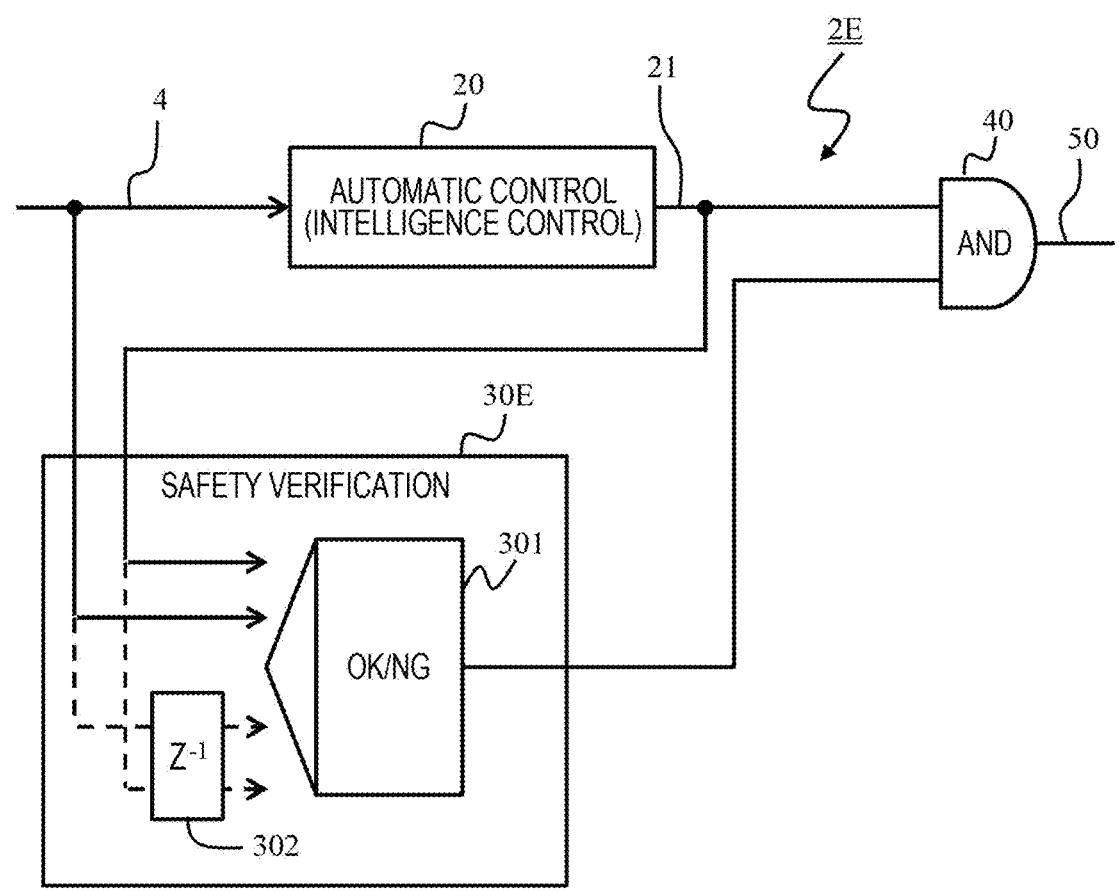
FIG. 26 is a block diagram of a control device according to a fifteenth embodiment.
Figure 27:
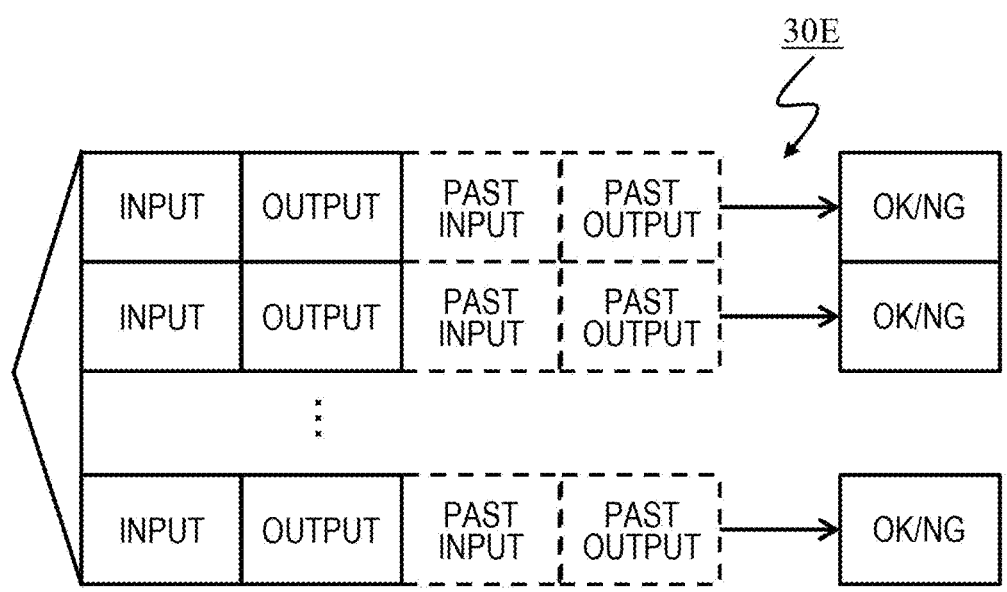
FIG. 27 is an explanatory diagram of an operation of a safety verification unit.

A fifteenth embodiment will be described with reference to FIGS. 26 and 27. A control device 2E according to the present embodiment includes the automatic control unit 20, a safety verification unit 30E, and the AND gate 40. The predetermined input 4 and the automatic control output 21 are input to the safety verification function 30E, and verification outputs (verification results) corresponding to the values 4 and 21 are output. The verification result which is the safety confirmation result is output as "OK" (safety) or "NG" (unsafety).

The safety verification unit 30E of the present embodiment is not restricted to the current input 4 and the current automatic control output 21, and a transition state from a past value may be used. When the state transition (to which a transition check 302) from the past value is focused on, the input 4 and the automatic control output 21 before one sample ($Z^{-1}$) are also input to the determination circuit 301.

The safety verification unit 30E outputs the verification result of the safety (OK) or unsafety (NG) based on the current predetermined input 4 and the current automatic control output 21 and the predetermined input 4 and automatic control output 21 (that is, the past input 4 and the past automatic control output 21) before one sample.

An operation of the safety verification unit 30E will be described with reference to FIG. 27. As illustrated in FIG. 27, the operation of the safety verification unit 30E can be defined using, for example, a content addressable memory (CAM). For example, in the CAM, the verification outputs (OK/NG) corresponding to these values are preset with a combination of the predetermined input 4 and the automatic control output 21 and the past predetermined input 4 and the past automatic control output 21 in a case where the transition check is performed as an entry.

The present embodiment having the aforementioned configuration also acquires the same effects as those of the first embodiment. The safety verification unit 30E of the present embodiment can determine whether the automatic control output 21 is safe with consideration for the past input 4 and the past automatic control output 21. Accordingly, the safety can be verified more efficiently and with high reliability.

Sixteenth Embodiment

Figure 28:
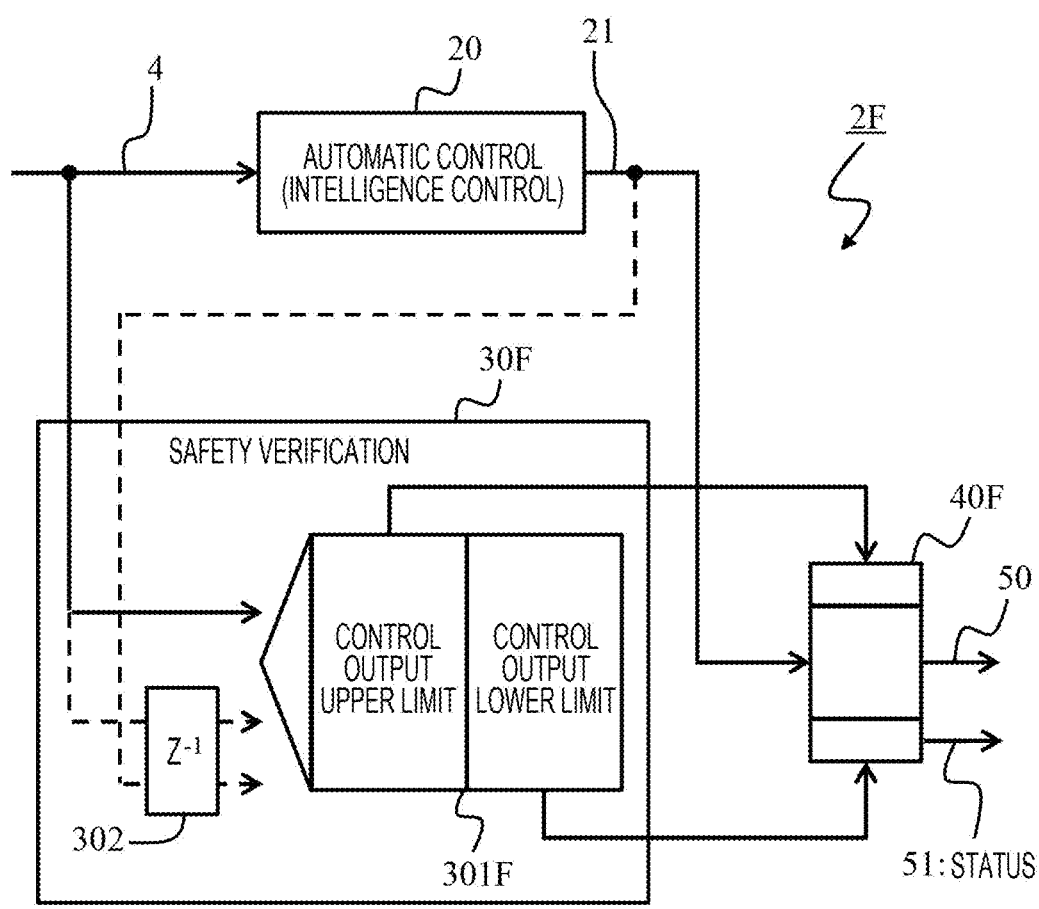
FIG. 28 is a block diagram of a control device according to a sixteenth embodiment.

A sixteenth embodiment will be described with reference to FIGS. 28 and 29. A control device 2F of the present embodiment can output the automatic control output 21 so as to be within a predetermined range determined by a predetermined output upper limit value and a predetermined output lower limit value.

The control device 2F includes the automatic control unit 20, a safety verification unit 30F, and a restriction value selection circuit 40F.

When the current predetermined input 4 and the current automatic control output 21 are input, the safety verification unit 30F outputs a control output upper limit and a control output lower limit corresponding to these values. As in the above embodiment, the safety verification unit 30F can also focus on the state transition from the past value. That is, in addition to the current input 4 and the current automatic control output 21, the past input 4 and the past automatic control output 21 before one sample ($Z^{\wedge}-1$) are input to the safety verification unit 30F. The safety verification unit 30F outputs a control output upper limit and a control output lower limit corresponding to the current and past information.

When the input automatic control output 21 is between the control output upper limit and the control output lower limit, the restriction value selection circuit 40F outputs the automatic control output 21 as the safety restriction output 50. When the input automatic control output 21 exceeds the control output upper limit, the restriction value selection circuit 40F outputs, as the safety restriction output 50, a value obtained by restricting the automatic control output 21 to the control output upper limit. When the input automatic control output 21 is less than the control output lower limit, the restriction value selection circuit 40F outputs, as the safety restriction output 50, a value obtained by restricting the automatic control output 21 to the control output lower limit.

The restriction value selection circuit 40F can output the safety verification result as a status 51. The status of the safety verification result is divided into multiple stages, for example, "OK", "OK w/limit", and "NG".

"OK" is a case where the automatic control output 21 is within the range of the control output lower limit and the control output upper limit. "OK w/limit" is a case where the automatic control output 21 is out of the range of the control output lower limit and the control output upper limit, but may be corrected to a value between the control output lower limit and the control output upper limit. That is, this value is a case where the automatic control output 21 can be corrected within the range of the control output lower limit and the control output upper limit. "NG" is a case where the automatic control output 21 is not within the range of the control output lower limit and the control output upper limit and is not able to use a value in the range between the control output lower limit and the control output upper limit (when control output lower limit <control output upper limit is not established).

Figure 29:
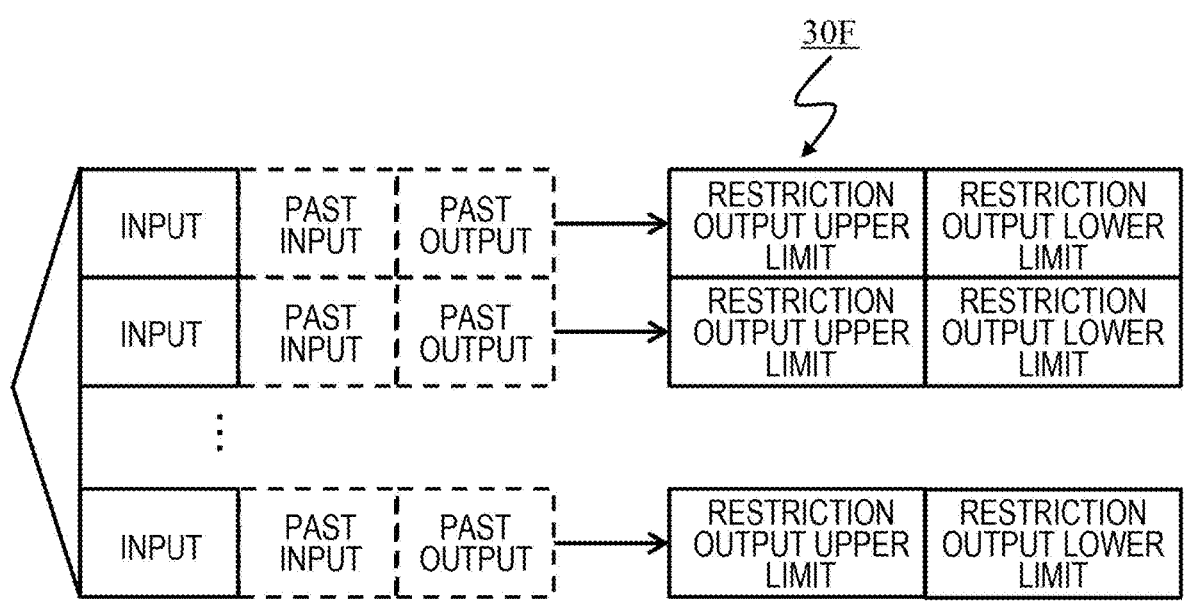
FIG. 29 is an explanatory diagram of the operation of the safety verification unit.

FIG. 29 illustrates an operation of the safety verification unit 30F in the present embodiment. As described in FIG. 27, the safety verification unit 30F can be equivalent to a CAM. When a combination of the current predetermined input 4 and the past predetermined input 4 and the past automatic control output 21 in a case where the transition check is performed is input, the safety verification unit 30F outputs the control output upper limit and the control output lower limit corresponding to these values.

The present embodiment having the aforementioned configuration also acquires the same effects as those of the fifteenth embodiment. In the present embodiment, the safety verification unit 30F outputs the restriction output lower limit and the restriction output upper limit, and the restriction value selection circuit 40F outputs, as the safety restriction output 50, the automatic control output 21 so as to be within the range of the restriction output lower limit and the restriction output upper limit. The safety verification unit 30F of the present embodiment can output the status of the safety verification result in multiple stages of "OK", "OK w/limit", and "NG". Therefore, according to the present embodiment, it is possible to obtain the safety restriction output 50 by using the automatic control output 21 more flexibly and safely.

Seventeenth Embodiment

Figure 30:
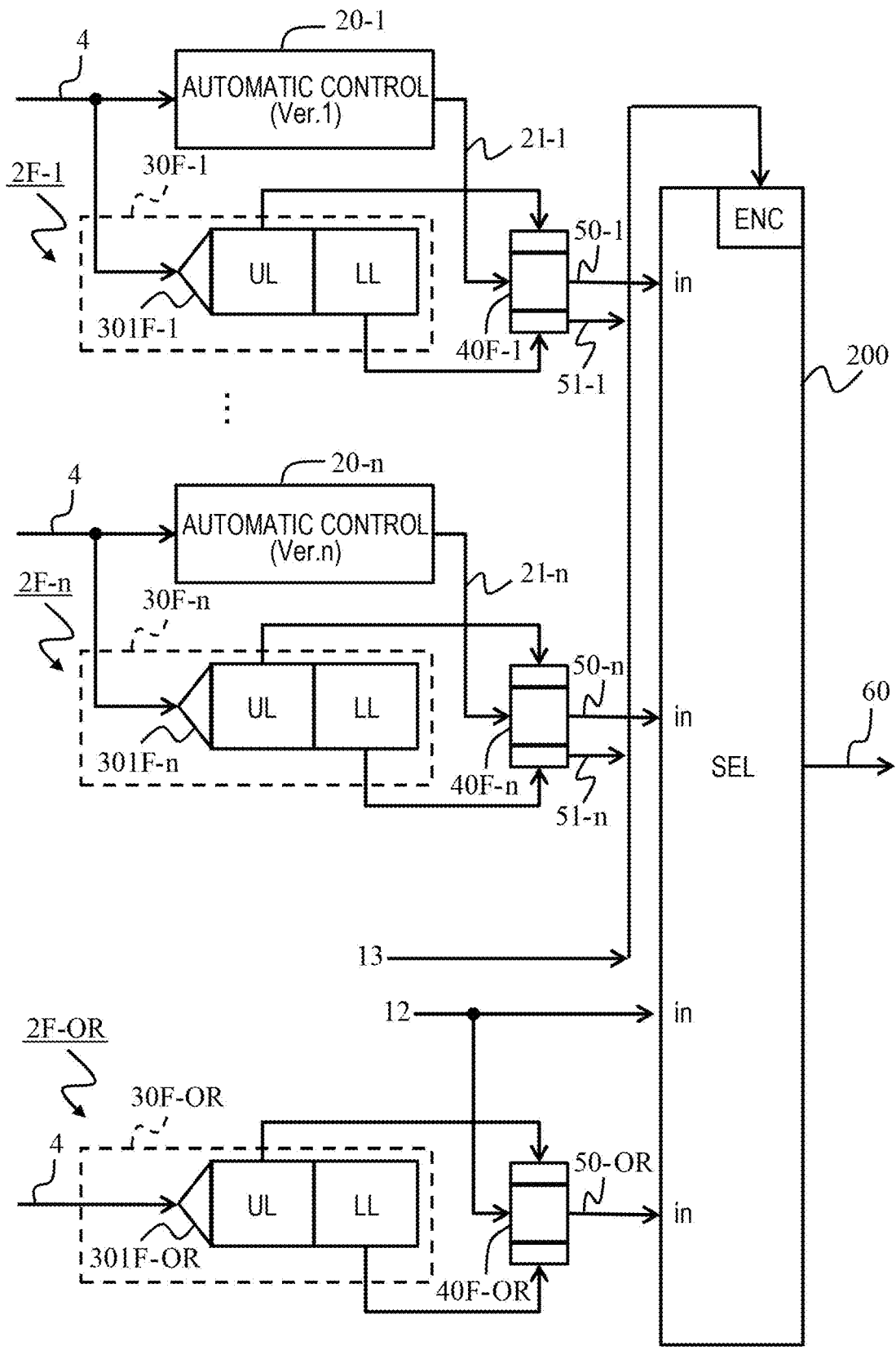
FIG. 30 is a block diagram of a control system according to a seventeenth embodiment.

A seventeenth embodiment will be described with reference to FIG. 30. FIG. 30 is a block diagram of a control system of the present embodiment. The control system of the present embodiment includes redundant control devices 2F-1 to 2F-n for automatic control in addition to a control device 2F-OR for realizing manual control (override under safety verification) of the user.

Statuses from restriction value selection circuits 40-1 to 40-$n$ and 40-OR of control devices 2F-1 to 2F-n and 2F-OR, and safety restriction outputs 50-1 to 50-$n$, and 50-OR, the manipulation quantity information 12 of the override that is not restricted by the safety verification unit, and the priority information 13 are input to an output selection unit 200. The output selection unit 200 selects any one of the safety restriction outputs 50-1 to 50-$n$ and 50-OR and the manipulation quantity information 12, and outputs the selected information as the control output 60.

Here, the control devices 2F-1 to 2F-n redundant for automatic control generate automatic control outputs under different types of predetermined control, that is, the automatic control units 20-1 to 20-$n$ of the control devices 2F-1 to 2F-n generate automatic control outputs 21-1 to 21-$n$ by processing predetermined inputs 4 according to different control methods. The different types of predetermined control may include, for example, machine learning control and feedback control. Even when the same algorithm is used, different control methods can be used by changing parameters. In the present embodiment, the feedback control such as proportional-integral derivative controller (PID control) is used for the automatic control unit 21-$n$ having the lowest priority to be selected, and the machine learning control is used for the other automatic control units 21-1 to 21-$n$-1 (not illustrated) for automatic control.

Figure 33:
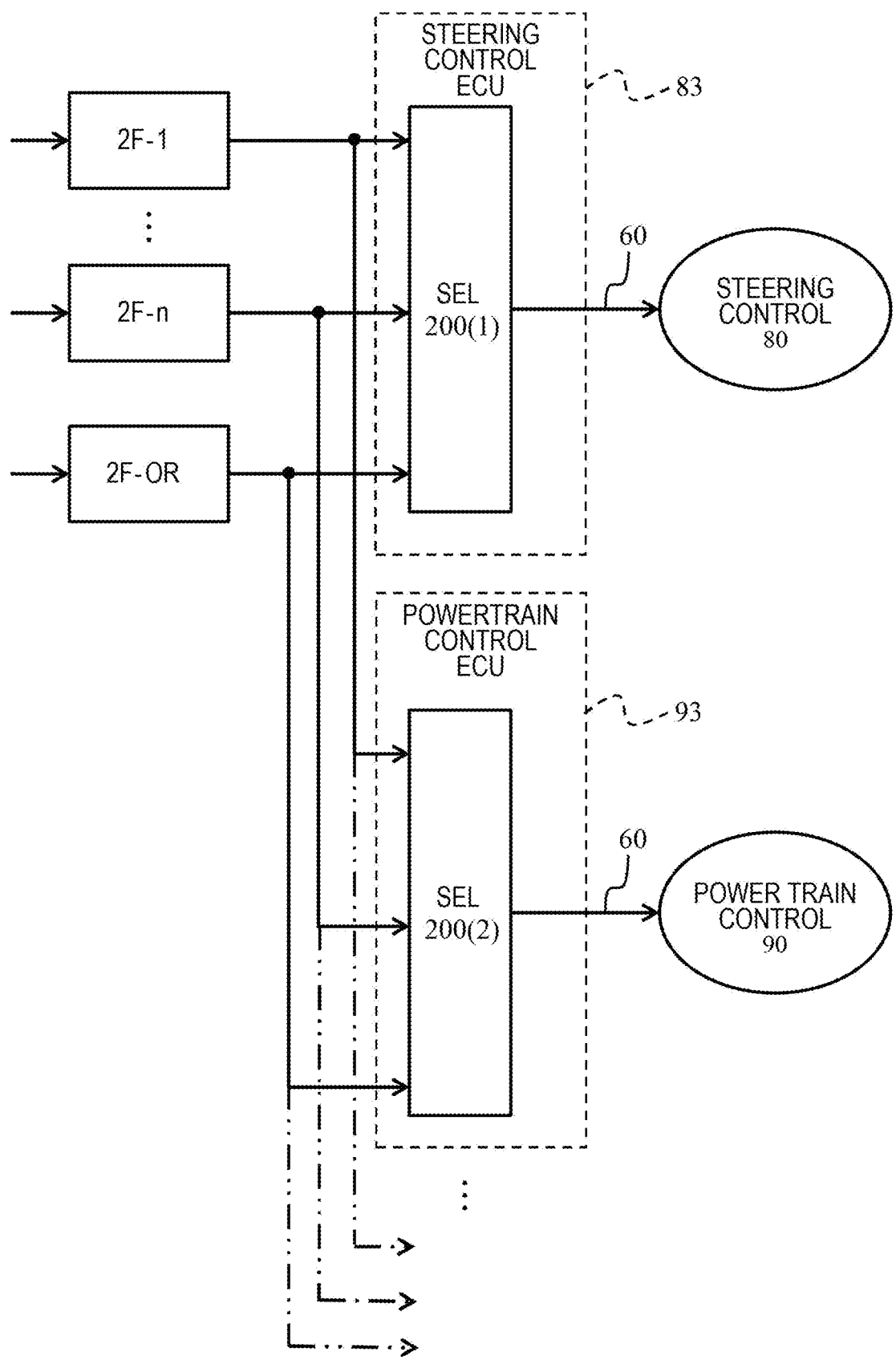
FIG. 33 is an explanatory diagram when the control system is applied to the automatic driving system.

An example of an output selection method using the output selection unit 200 will be described with reference to FIGS. 31 and 32. FIG. 32 illustrates a first example of the output selection method. FIG. 33 illustrates a second example of the output selection method. Any method may be adopted. The output selection method may be switched depending on the surrounding environment.

FIGS. 31 and 32 include, for example, a case number column, an override manipulation quantity information column, an automatic control output column, and a control output column. In the override manipulation quantity information column, the priority information 13 and the safety verification result are set. In the automatic control output column, the safety verification results of the automatic control outputs 21-1, 21-2, and 21-$n$ are set. In the control output column, any of the automatic control outputs 21-1, 21-2, and 21-$n$ output as the control output 60 or the manipulation quantity information is set. FIGS. 31 and 32 illustrate three automatic control outputs 21-1, 21-2, and 21-$n$, but FIG. 30 illustrates only two automatic control outputs 21-1 and 21-$n$. In the following description, a plurality of automatic control units may be referred to as automatic control units 20-1 to 20-$n$, and a plurality of automatic control outputs may be referred to as automatic control outputs 21-1 to 21-$n$. In FIGS. 31 and 32, several cases are described as examples of the automatic control output 21 or the manipulation quantity 12 used as the control output 60.

Case numbers #1 to #9 are a mode in which any one of automatic control outputs 21-1, 21-2, and 21-n is the control output 60 when the value of the priority information 13 is "0", that is, under the restriction of the safety verification unit 30 is illustrated. Case numbers #10 and #11 are a mode in which the override is permitted under the restriction of the safety verification units 30F-1 to 30F-n. Case number #12 is a mode in which the override is permitted without being restricted by the safety verification unit.

As described above, high priority is set to the automatic control outputs 21-1 to 21-n for automatic control in ascending order of numbers assigned after the hyphen. The automatic control output 21-1 has the highest priority, the automatic control output 21-2 has the second highest priority, and the automatic control output 21-n has the lowest priority. This priority corresponds to a "selection priority".

In FIGS. 31 and 32, "*" indicates that a value is not determined. In FIGS. 31 and 32, one automatic control output having the highest priority is selected. Therefore, when the safety verification result of the automatic control output 21-1 having the highest priority is "OK", the automatic control output 21-1 is selected regardless of the contents of the safety verification results of the other automatic control outputs 21-2 to 21-n (Case #1). When the safety verification result of the automatic control output 21-1 is "NG" and the safety verification result of the automatic control output 21-2 having the second highest priority is "OK", the automatic control output 21-2 is selected regardless of the contents of the safety verification results of the other automatic control outputs 21-2 to 21-n (Case #2). The same selection is subsequently performed. When only the safety verification result of the automatic control output 21-n having the lowest priority indicates "OK", the automatic control output 21-n is selected (Case #3).

When each of the safety verification results of the automatic control outputs 21-1 to 21-n is "OK w/limit" indicating conditional safety, the automatic control output 21-1 having the highest priority is selected with output restriction (Case #4). When only the safety verification result of the automatic control output 21-1 having the highest priority indicates "OK w/limit" and the safety verification results of the other automatic control outputs 21-2 to 21-n are all "NG", the automatic control output 21-1 is selected with the output restriction (Case #5).

When the safety verification result of the automatic control output 21-1 having the highest priority is "NG" and the safety verification results of the other automatic control outputs 21-2 to 21-n are all "OK w/limit", the automatic control output 21-2 having the highest priority is selected with the output restriction from among the automatic control outputs 21-2 to 21-n indicating "OK w/limit" (Case #6). When only the safety verification result of the automatic control output 21-2 having the second highest priority illustrates "OK w/limit" and the safety verification results of the other automatic control outputs are all "NG", the automatic control output 21-2 is selected with the output restriction (Case #7).

When only the safety verification result of the automatic control output 21-n having the lowest priority illustrates "OK w/limit" and the safety verification results of the other automatic control outputs are all "NG", the automatic control output 21-n is selected (Case #8). When the safety verification results of all the automatic control outputs 21-1 to 21-n prepared for automatic control are all "NG", since there is no automatic control output capable of being used as the control output 60, the output is stopped (Case #9).

When the priority information 13 is equal to or greater than "1" and is less than "2" and the safety verification result is "OK", the control output 60 is generated by using the manipulation quantity information 12 (Case #10). When the priority information 13 is equal to or greater than "1" and is less than "2" and the safety verification result is "OK w/limit", the control output 60 is generated by using manipulation quantity information 12 with the output restriction (Case #11).

When the priority information 13 is equal to or greater than "2", the manipulation quantity information 12 is used as the control output 60 (Case #12).

In the example of FIG. 32, the output is stopped without selecting the automatic control output of which the safety verification result is "OK w/limit" (Cases #4 to #9.

The example in which the safety verification units 30-1 to 30-n are respectively provided in the automatic control units 20-1 to 20-n has been described above. Instead, as described in the third embodiment, the plurality of safety verification units 30 may be provided for each of the automatic control units 20-1 to 20-n.

When the safety verification units 30 multiplexed in one automatic control unit 20 are provided and any one of the safety verification units 30 determines "NG", the output can be stopped. Alternatively, when it is determined as "OK" or "OK with/limit" in the safety verification unit 30 having a low false-negative probability (event in which the safety verification unit is normal but is erroneously determined to be abnormal (dangerous)), even though it is determined as "NG" in the safety verification unit 30 having a high false-negative probability, the control output 60 can be output based on the result of the safety verification unit 30 having the low false-negative probability.

FIG. 33 is an example of a physical implementation of the system illustrated in FIG. 30. In the system configuration illustrated in FIG. 30, since only one output selection unit 200 is provided, the output selection unit 200 becomes a single point of failure. Accordingly, when the output selection unit 200 fails, the entire system fails. That is, in a system configuration example of FIG. 33, the output selection unit 200 becomes a bottleneck in achieving the high reliability of the system.

Therefore, in the example illustrated in FIG. 33, the output selection unit 200 is provided for each edge-side control function of operating according to the control output 60, and each edge-side control function and the output selection unit 200 are implemented in separate control devices. For example, in the thirteenth embodiment described with reference to FIG. 20, the steering control unit 80 and the output selection unit 200(1) are implemented as a steering control ECU 83. Similarly, the powertrain control unit 90 and the output selection unit 200(2) are implemented as a powertrain control ECU 93.

In FIG. 33, one steering control ECU 83 and one powertrain control ECU 93 are illustrated. However, a plurality of ECUs 83 and 93 may be provided, and redundancy may be provided to the system. The configuration example of FIG. 33 can also be applied to other ECUs such as a brake control ECU.

The present embodiment having the aforementioned configuration also acquires the same effects as those of the sixteenth embodiment. In the present embodiment, the control device can be suitably used for the automatic driving system of the vehicle.

Eighteenth Embodiment

An eighteenth embodiment will be described with reference to FIGS. 34 to 39. In the present embodiment, a case where the present invention is applied to multivariable control will be described. In the above-described embodiments, single-variable control has been described. However, an actual system simultaneously controls a plurality of variables. Therefore, in the present embodiment, a case where the present invention is applied to two-variable control will be described as an example of multivariable control. The same applies when three or more variables are used.

Figure 34:
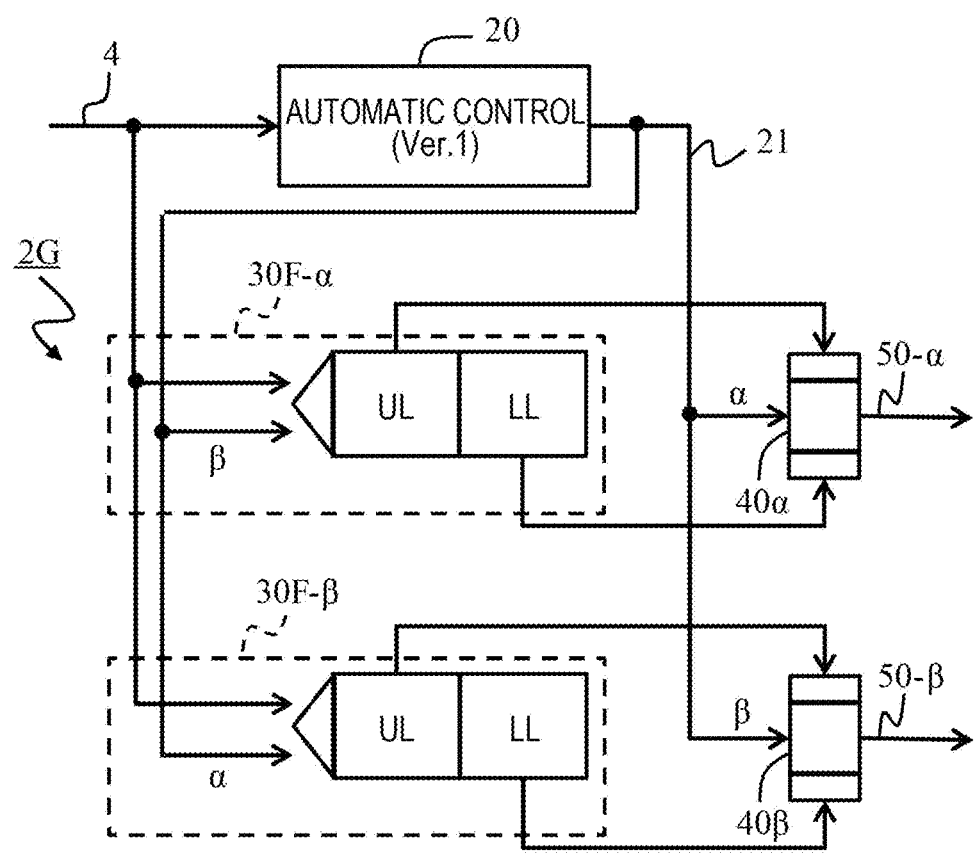
FIG. 34 is a block diagram of a control device according to an eighteenth embodiment.

FIG. 34 illustrates a configuration example of a control device 2G according to the present embodiment. The automatic control unit 20 of the control device 2G outputs two variables of $\alpha$ and $\beta$. Safety verification units 30F-$\alpha$ and 30F-$\beta$ and restriction value selection circuits 40a and 40(corresponding to the variables a and R are provided in the automatic control unit 20.

The predetermined input 4 and a $\beta$ component of the automatic control output 21 are input to the safety verification unit 30F-$\alpha$, and a control output upper limit and a control output lower limit of an $\alpha$ component corresponding to these values are output. Similarly, the predetermined input 4 and the $\alpha$ component of the automatic control output 21 are input to the safety verification unit 30F-$\beta$, and a control output upper limit and a control output lower limit of the $\beta$ component corresponding to these values are output.

Figure 35:
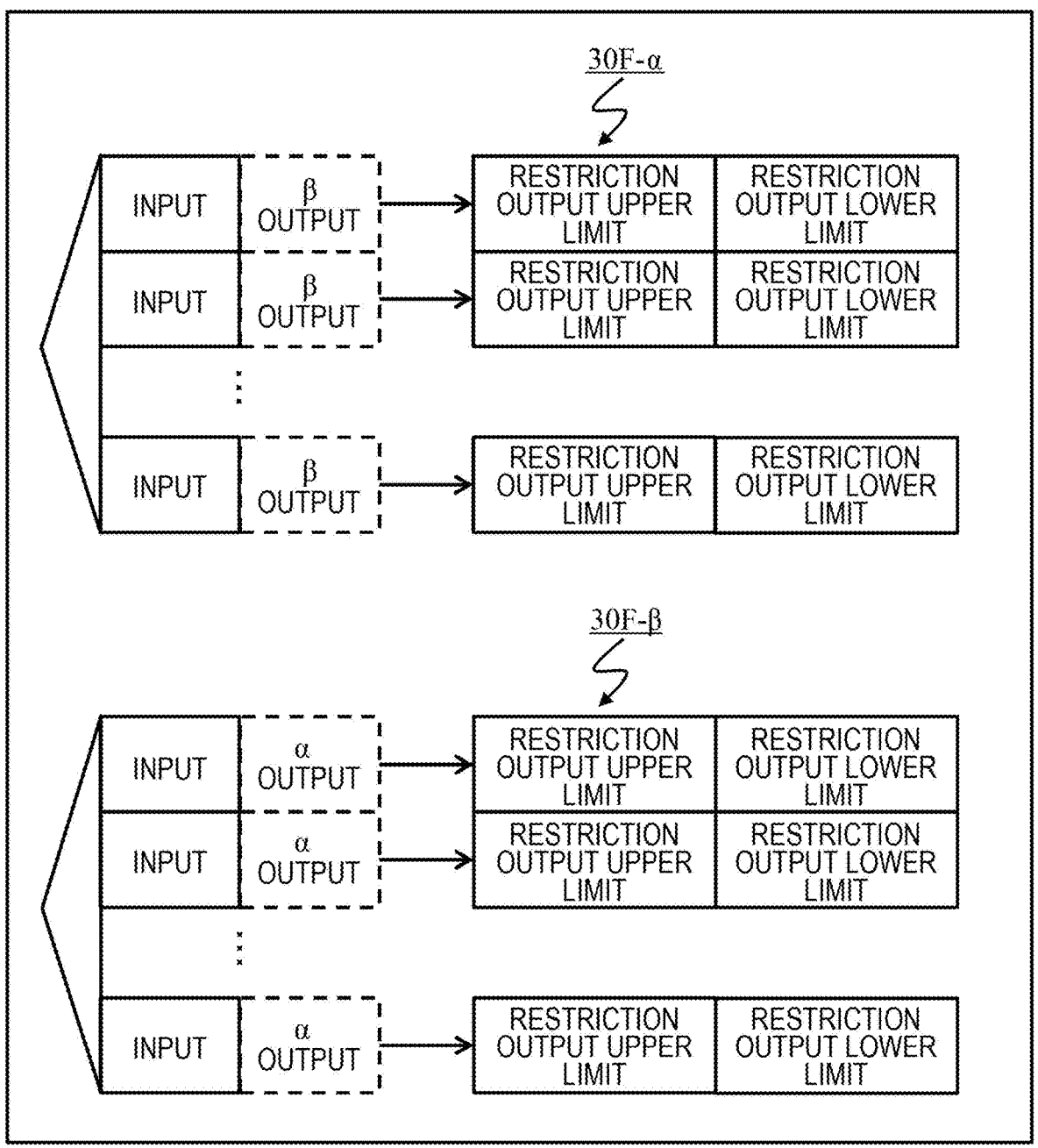
FIG. 35 is an explanatory diagram of the operation of the safety verification unit.

FIG. 35 illustrates an operation example of the safety verification units 30F-$\alpha$ and 30F-$\beta$. The safety verification unit 30F-$\alpha$ uses a combination of the predetermined input 4 and the $\beta$ component of the automatic control output 21 as an entry, and outputs the control output upper limit and the control output lower limit of the $\alpha$ component corresponding to these values. The safety verification unit 30F-$\beta$ uses a combination of the predetermined input 4 and the $\alpha$ component of the automatic control output 21 as an entry, and outputs the control output upper limit and the control output lower limit of the $\beta$ component corresponding to these values.

Figure 36:
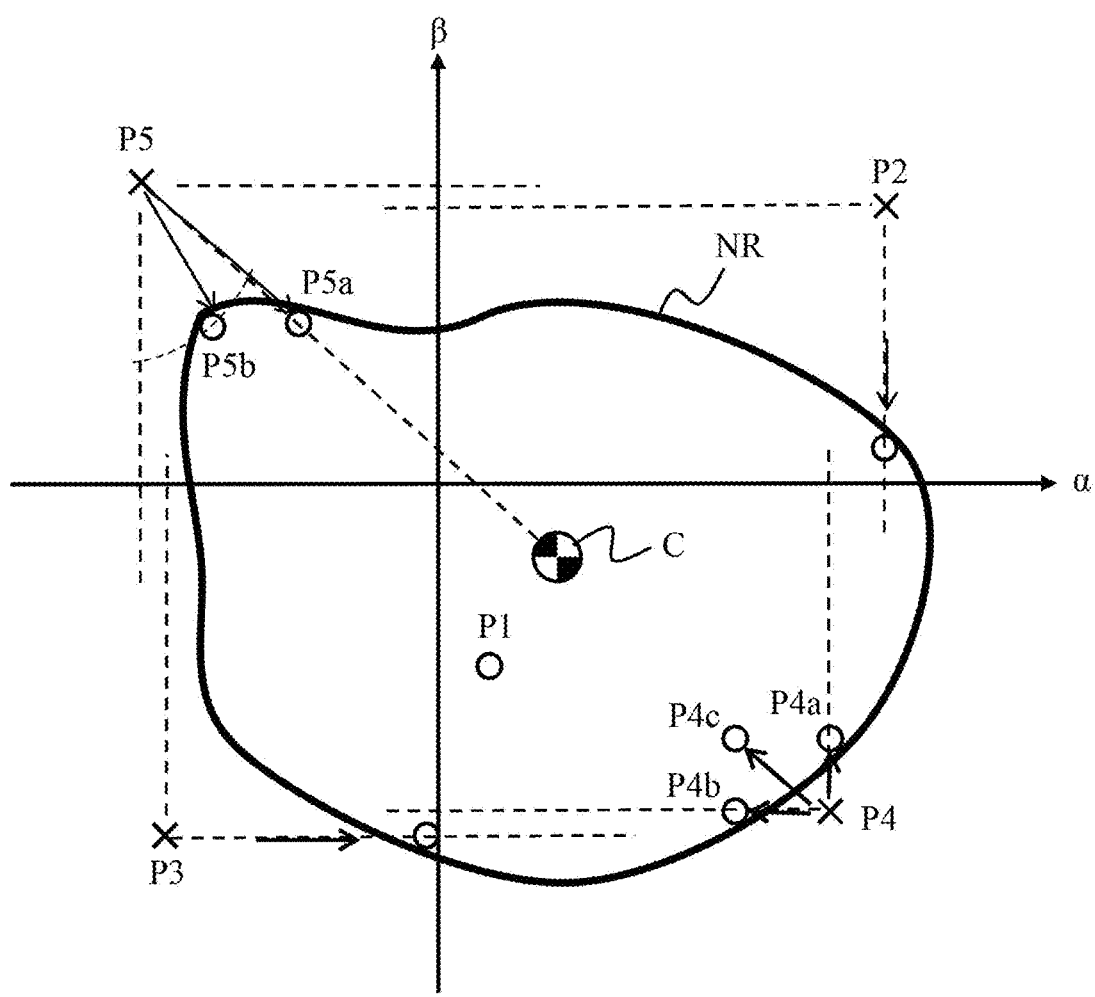
FIG. 36 is an explanatory diagram illustrating an example in which an automatic control output including multiple variables is restricted.

FIGS. 36 and 37 are examples in which the automatic control outputs 21 ($\alpha i$, $\beta i$) are restricted. A vertical axis in FIG. 36 indicates a value of the $\beta$ component, and a horizontal axis in FIG. 36 indicates a value of the $\alpha$ component. P1 to P5 are examples of values of the automatic control outputs 21 having the $\alpha$ component and the $\beta$ component. A range NR indicated by a bold line indicates a normal range (normal region) in which the automatic control output 21 is located between the restriction output upper limit and the restriction output lower limit. FIG. 37 is a table representing a relationship between an example of the automatic control output 21 and the safety control output 60.

In the example P1, both the $\alpha$ component and the $\beta$ component are within the range of the control output upper limit and the control output lower limit. Accordingly, in the case of the example P1, the automatic control output 21 is output as the safety restriction output 50 without being restricted by the safety verification unit 30.

The example P2 indicates a case where the automatic control output is out of the normal region NR but there is a restriction solution in the $\beta$ component at $\alpha=\alpha i$. In the example P2, the automatic control output is output as the safety restriction output 50 by restricting the value of the $\beta$ component of the automatic control output 21.

The example P3 indicates a case where the automatic control output is out of the normal region NR but there is a restriction solution in the $\alpha$ component at $\beta=\beta i$. In the example P3, the automatic control output is output as the safety restriction output 50 by restricting the value of the $\alpha$ component.

The example P4 indicates a case where there are restriction solutions in both the $\alpha$ component and the $\beta$ component. In the example P4, there are three patterns of a case where the value of the $\beta$ component is restricted (P4a), a case where the value of the $\alpha$ component is restricted (P4b), and a case where both the $\alpha$ component and the $\beta$ component are restricted (P4c).

In the example P4a, the automatic control output is output as the safety restriction output 50 by restricting the value of the $\beta$ component. In the example P4b, the automatic control output is output as the safety restriction output 50 by restricting the value of the $\alpha$ component. In the example P4c, the automatic control output is output as the safety restriction output 50 by restricting the values of both the $\alpha$ component and the $\beta$ component.

The example P5 indicates a case where there are no restriction solutions in the $\alpha$ component nor the $\beta$ component. In the example P5, any one of a case where the output is stopped or the $\alpha$ component and the $\beta$ component of $\beta$ point corrected in a direction of a center of gravity C of the normal region NR are output as the safety restriction output 50 (P5a) and a case where the $\alpha$ component and the $\beta$ component of a point corrected for a shortest distance to the normal region NR is output as the safety restriction output 50 (P5b) is considered.

In the case of the example P4, the selection of any one method of the examples P4a to P4c depends on a policy on which the restriction on any one value of the $\alpha$ component and the R component is prioritized, and depends on an application or a situation given as an input "1". In the example of the automatic driving, there are two control target values of "speed" and "yaw rate". The speed and the yaw rate are restricted such that a centrifugal force does not exceed a grip force of a tire. When there is an obstacle in a traveling direction or a horizontal direction of the vehicle, the speed is restricted without restricting the yaw rate. When there is no obstacle in the horizontal direction of the vehicle, the yaw rate other than the speed is restricted in order to increase energy efficiency (in order to reduce energy loss due to deceleration).

The aforementioned example P4a is a case where the restriction of the value of the $\beta$ component is prioritized. The aforementioned example P4b is a case where the restriction of the value of the component is prioritized. The aforementioned example P4c is a case where the values of both the $\alpha$ component and the $\beta$ component need to be restricted.

Figure 38:
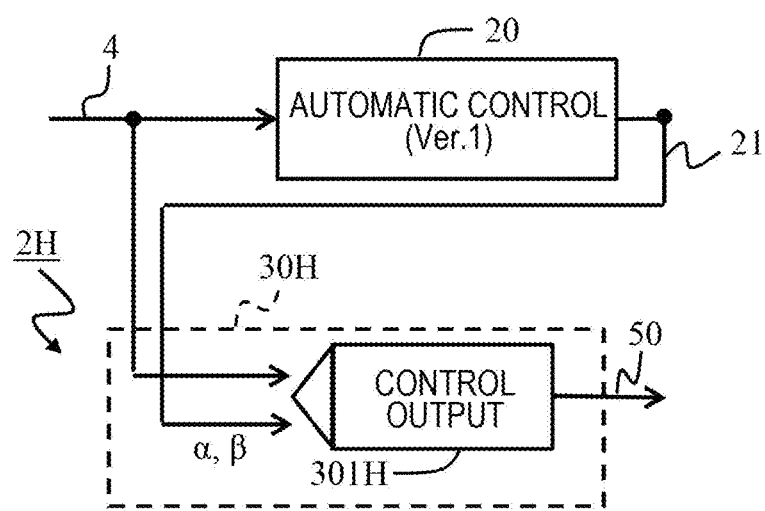
FIG. 38 is a block diagram of the safety verification unit that verifies the safety of the automatic control output including the multiple variables.
Figure 39:
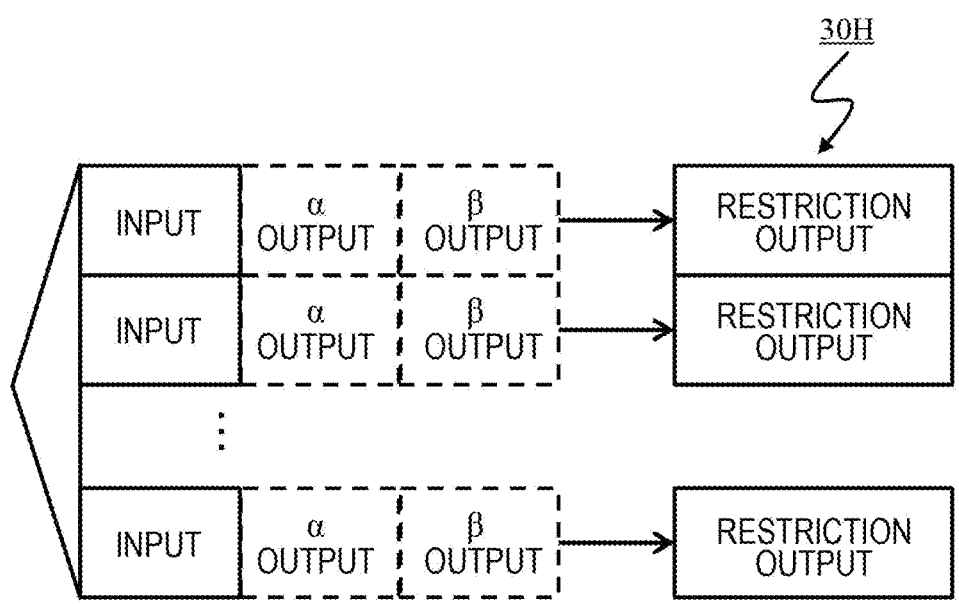
FIG. 39 is an explanatory diagram of the operation of the safety verification unit.

The example P5 is the easiest realization example with the configuration described in FIGS. 34 and 35. For the examples P5a and P5b, as illustrated in FIGS. 38 and 39, a control device 2H including a safety verification unit 30H using an input 4, an $\alpha$ output, and a $\beta$ output as entries is used.

The present embodiment having the aforementioned configuration also acquires the same effects as those of the sixteenth embodiment. The present embodiment can also be applied to the multivariable control.

Nineteenth Embodiment

Figure 40:
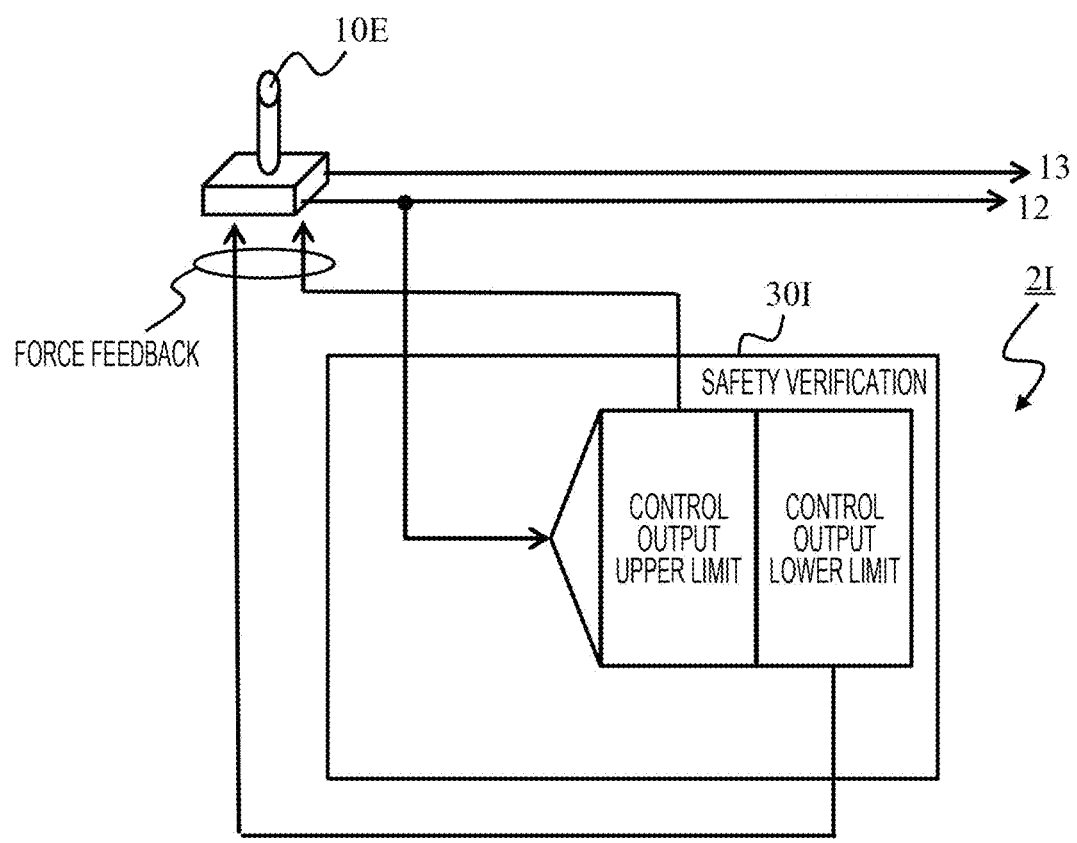
FIG. 40 is a block diagram of a control device according to a nineteenth embodiment.
Figure 41:
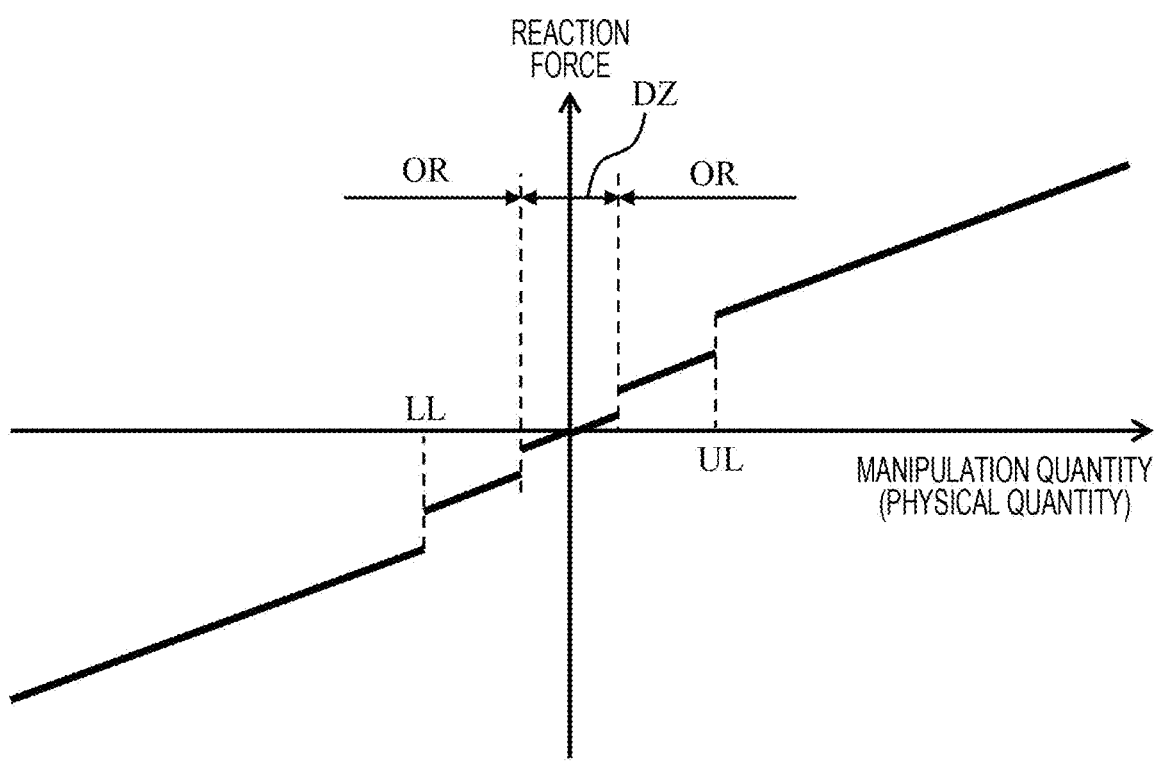
FIG. 41 is an explanatory diagram illustrating a relationship between a reaction force appearing in the manipulation interface unit and the manipulation quantity (physical quantity).

A nineteenth embodiment will be described with reference to FIGS. 40 and 41. In the present embodiment, force feedback is applied to the manipulation interface unit 10E based on a control output upper limit and a control output lower limit of a safety verification unit 30I. FIG. 40 is a configuration diagram illustrating a relationship between a control device 2I and the manipulation interface unit 10E according to the present embodiment. FIG. 41 is a graph representing a relationship between the manipulation quantity (physical quantity) applied to the manipulation interface unit 10E and the reaction force.

The restriction output upper limit and the restriction output lower limit of the safety verification unit 30I are input as the force feedback to the manipulation interface unit 10E. A vertical axis in FIG. 41 represents the reaction force, and a horizontal axis represents the manipulation quantity (physical quantity). As illustrated in FIG. 41, a manipulation quantity (physical quantity) corresponding to a boundary between a dead zone DZ (a manipulation region in which the override is not performed) and an override region OR, a manipulation quantity (physical quantity) corresponding to the control output upper limit, and a manipulation quantity (physical quantity) corresponding to the control output lower limit are depicted as the manipulation quantity 11, the reaction force has a discontinuous point.

The priority information 13 is "0" when the manipulation quantity (physical quantity) 11 is the dead zone DZ, and "1" when the manipulation quantity (physical quantity) 11 is the override region OR.

The present embodiment having the aforementioned configuration also acquires the same effects as those of the sixteenth embodiment. According to the present embodiment, the user can recognize the manipulation quantity (physical quantity) 11 corresponding to the boundary between the dead zone DZ and the override region OR, the manipulation quantity (physical quantity) 11 corresponding to the control output upper limit, and the manipulation quantity (physical quantity) 11 corresponding to the boundary of the control output lower limit through the discontinuous point of the reaction force. Therefore, according to the present embodiment, since it is possible to distinguish between the manipulation region DZ in which the override is not performed and the manipulation region OR in which the override is performed, between the inside and the outside of the range of the control output upper limit, and between the inside and the outside of the range of the control output lower limit, the user can manipulate the manipulation interface unit 10E while being aware of these regions. Although it has been described in FIG. 40 that the manipulation interface unit 10E is used as the example, the manipulation interface units 10D and 10F may be used.

Twentieth Embodiment

Figure 42:
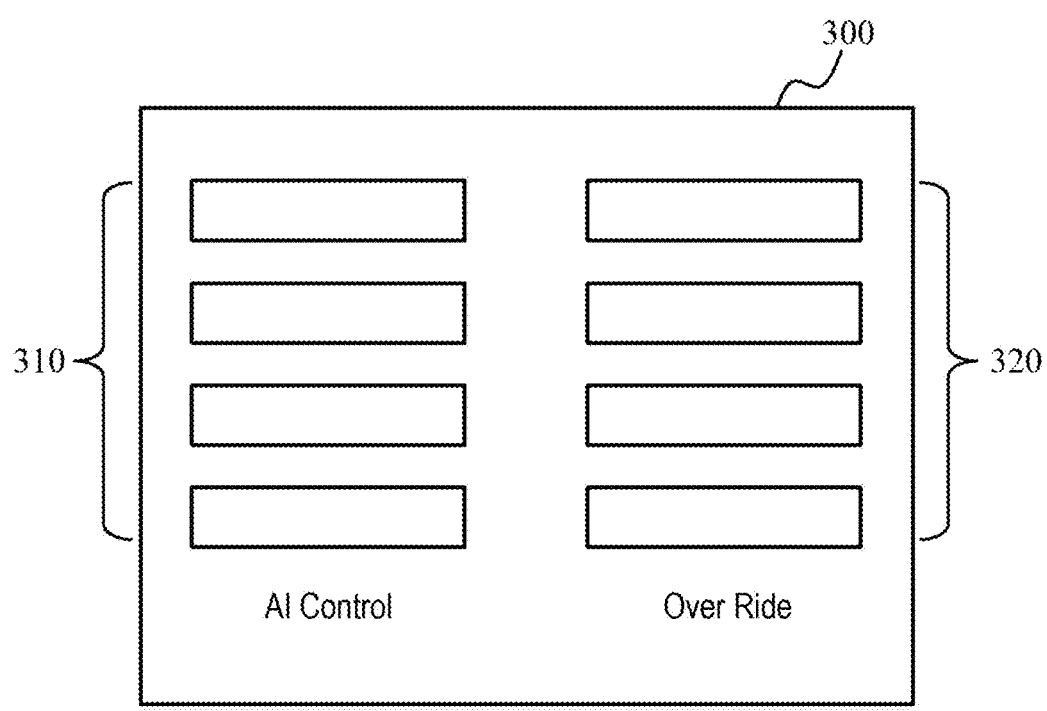
FIG. 42 is an explanatory diagram illustrating an example of a man-machine interface according to a twentieth embodiment for notifying a user of a state of the control system.

A twentieth embodiment will be described with reference to FIG. 42. FIG. 42 illustrates an example of a man-machine interface (display device) 300. The control system 1 can notify the user of a control status through the man-machine interface 300.

The man-machine interface unit 300 includes a plurality of display lamp groups 310 and 320. In the display lamp group 310, the number of normal automatic control units 20-1 to 20-$n$ is expressed by the number of lamps turned on. In the display lamp group 320, the priority of the override is expressed by the number of lamps turned on.

In the display lamp group 310, it is possible to change color to be turned on according to the safety verification results for the automatic control units 20-1 to 20-$n$. For example, the lamp is turned on in green for the automatic control unit of which the safety verification result is "OK", and the lamp is turned on in yellow for the automatic control unit of which the safety verification result is "OK w/limit". When the safety verification result is "NG", the lamp is turned off.

A case where the present embodiment is applied to the nineteenth embodiment will be described. In this case, a status at the time of the override can be expressed by the number of lamps turned on constituting the display lamp group 320. For example, in the case of the manipulation region in which the override is not performed, all the lamps are turned off (the number of lamps to be turned on=0). In the manipulation region in which the override is performed within the range of the control output upper limit or the control output lower limit, only one lamp is turned on. In the case of the manipulation region in which the override is performed out of the range of the control output upper limit or the range of the control output lower limit, two lamps are turned on.

In the display lamp group 320, the status at the time of the override can be expressed by the color of the lamp turned on. For example, in the case of the manipulation region in which the override is not performed, the lamp may not be turned on. In the case of the manipulation region in which the override is performed within the range of the control output upper limit or the control output lower limit, the lamp may be turned on in green. In the case of the manipulation region in which the override is performed out of the range of the control output upper limit or the range of the control output lower limit, the lamp may be turned on in yellow.

The present embodiment having the aforementioned configuration also acquires the same effects as those of the sixteenth embodiment. According to the present embodiment, the status of the control system 1 can be accurately and promptly notified to the user through the man-machine interface 300. Accordingly, the user can quickly take an appropriate measure against an abnormal situation such as the occurrence of a failure, and the usability and reliability are improved.

The invention is not limited to the aforementioned embodiments. The aforementioned embodiments can be added and changed by a person skilled in the art in various manners within the scope of the present invention. For example, the embodiments can be appropriately combined. The configurations described in the claims can be combined other than the explicitly described combinations.

For example, the aforementioned embodiments can also be expressed as follows. The following expressions may be arbitrarily combined for the features described in the claims.

Expression 1. A control system in which a manipulation interface unit has at least one threshold, and priority information is set to a first value when a duration of a manipulation quantity exceeds a predetermined first threshold, and the priority information is set to a second value when the duration of the manipulation quantity exceeds a second threshold.

Expression 2. A control system in which the manipulation interface unit converts a manipulation quantity input in a first direction of movable directions of a manipulation lever into the manipulation quantity information and converts a manipulation quantity input in a second direction of the movable directions which is different from the first direction into the priority information.

Expression 3. A control system in which the manipulation interface unit includes a pressure sensor, and converts a pressure input to the pressure sensor into the priority information.

Expression 4. A control system in which the manipulation interface unit includes a push button, and converts a pushing quantity applied to the push button into the priority information.

Expression 5. A control system that includes an automatic control unit that generates an automatic control output and a safety verification unit that confirms safety of the automatic control output, in which a control output is output when the safety is confirmed by the safety verification unit, and the control output is stopped or the control output is output within a range in which the safety is confirmed when the safety is not confirmed by the safety verification unit. An artificial intervention manipulation for the automatic control output is permitted within the range in which the safety is confirmed by the safety verification unit.

Expression 6. The control system described in Expression 5 in which a first operation mode in which an operation is performed based on the automatic control output, a second operation mode in which the artificial intervention manipulation is permitted within the range in which the safety is confirmed by the safety verification unit, and a third operation mode in which the artificial intervention manipulation is permitted regardless of whether or not the safety is confirmed by the safety verification unit are prepared, and the first to third operation modes are able to be switched.

Expression 7. The control system in which the manipulation interface unit is constituted by at least one of a steering force sensor, a steering angle sensor, an accelerator pedal angle sensor, and a brake pedal angle sensor.

Expression 8. The control system in which the manipulation interface unit generates the priority information based on biological information and/or facial expression information of a user.

REFERENCE SIGNS LIST 1 control system
2, 2A, 2B, 2C, 2D, 2E, 2F, 2G, 2H, 2I control device
3, 3A, 3B output control unit
4 input
10, 10A, 10B, 10C, 10D, 10E, 10F, 10G, 10H, 10J manipulation interface unit
11 manipulation quantity (physical quantity)
12, 12A, 12B, 12C manipulation information
13 priority information
20 automatic control unit
21 automatic control output
30, 30E, 30F, 30H, 30I safety verification unit
40 AND gate (or minimum value selection circuit)
40F restriction value selection circuit
50 safety restriction output
51 status
60 control output
200 output selection unit

The invention claimed is:

1. A control system that generates a control output, the system comprising:
one or more processors and one or more non-transitory computer-readable storage media, the non-transitory computer-readable storage media having stored thereon at least a plurality of automatic control units and safety verification units, and;
a manipulation interface unit that generates manipulation quantity information and priority information based on a manipulation quantity which is a physical quantity;
wherein the plurality of automatic control units generate automatic control outputs based on predetermined inputs;
wherein the safety verification units confirm safety for the automatic control outputs, respectively; and
an output control unit that outputs a control output according to any one of a predetermined automatic control output selected from the automatic control outputs and the manipulation quantity information based on the automatic control outputs, the manipulation quantity information and the priority information, and the safety confirmation results of the safety verification units,
wherein, based on the priority information,
the output control unit either:
selects, as the predetermined automatic control output, an automatic control output having the highest selection priority from the automatic control outputs of which the safety is confirmed by the safety verification units among the automatic control outputs, and generates the control output according to the selected predetermined automatic control output, or
generates the control output according to the manipulation quantity information wherein a predetermined safety verification unit among the safety verification units confirms the safety of the predetermined automatic control output.

2. The control system according to claim 1,
wherein, when the safety is not confirmed for all the automatic control outputs by the safety verification units, the output control unit selects, as the predetermined automatic control output, an automatic control output having the highest selection priority from the automatic control outputs of which the safety is confirmed by the safety verification units in a predetermined range set in advance among the automatic control outputs, and generates the control output by using the selected predetermined automatic control output within the predetermined range.

3. The control system according to claim 1,
wherein, when the safety is not confirmed for all the automatic control outputs by the safety verification units, the output control unit stops the control output.

4. The control system according to claim 1,
wherein the safety verification units confirm the safety in multiple stages of safety, safety in a predetermined range, and unsafe.

5. The control system according to claim 1,
wherein each of the safety verification units confirms the safety of each of the automatic control outputs based on the predetermined input, a past predetermined input, and a past automatic control output.

6. The control system according to claim 1,
wherein, when each of the automatic control outputs includes an automatic control output for each of a plurality of variables, each of the safety verification units confirms safety of an automatic control output of a first variable included in the plurality of variables based on an automatic control output of a second variable which is included in the plurality of variables and is based on the first variable and the predetermined input.

7. The control system according to claim 1,
wherein the automatic control units generate the automatic control outputs by processing the predetermined inputs under different types of predetermined control,
machine learning control and feedback control are included in the predetermined control, and a selection priority of the machine learning control is set to be higher than a selection priority of the feedback control.

8. The control system according to claim 1,
wherein the output control unit generates the control output according to the predetermined automatic control output in a first case classified based on the priority information, generates the control output according to the manipulation quantity information when the safety verification units confirm the safety in a second case classified based on the priority information, and generates the control output according to the manipulation quantity information regardless of the safety confirmation results of the safety verification units in a third case classified based on the priority information.

9. The control system according to claim 8,
wherein the first case is a case where the priority information is less than a predetermined first value, the second case is a case where the priority information is equal to or greater than the predetermined first value and is less than a predetermined second value set to be greater than the predetermined first value, and the third case is a case where the priority information is equal to or greater than the predetermined second value.

10. A control method of generating a control output, the method comprising:

generating manipulation quantity information and priority information from a manipulation quantity which is a physical quantity;

generating automatic control outputs;

confirming; and outputting a control output according to any one of a predetermined automatic control output selected from the automatic control outputs and the manipulation quantity information based on the automatic control outputs, the manipulation quantity information and the priority information, and safety confirmation results, wherein, based on the priority information either:

selecting, as the predetermined automatic control output, an automatic control output having a highest selection priority from the automatic control outputs of which the safety is confirmed among the automatic control outputs, and generating the control output according to the selected predetermined automatic control output and the manipulation quantity information, or generating the control output according to the manipulation quantity information wherein a predetermined safety verification unit among the safety verification units confirms the safety of the predetermined automatic control output.

* * * * *